United States Patent
Zhan et al.

(10) Patent No.: US 11,425,289 B2
(45) Date of Patent: Aug. 23, 2022

(54) SYSTEMS AND METHODS FOR ADJUSTING POSITION OF PHOTOSENSITIVE CHIP OF IMAGE ACQUISITION DEVICE

(71) Applicant: ZHEJIANG DAHUA TECHNOLOGY CO., LTD., Zhejiang (CN)

(72) Inventors: Hui Zhan, Hangzhou (CN); Liang Xu, Hangzhou (CN); Yanhui Liu, Hangzhou (CN); Zhengchun Luo, Hangzhou (CN); Shuxin Shuai, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/185,881

(22) Filed: Feb. 25, 2021

(65) Prior Publication Data
US 2021/0185196 A1   Jun. 17, 2021

Related U.S. Application Data

(63) Continuation of application No. PCT/CN2019/102955, filed on Aug. 28, 2019.

(30) Foreign Application Priority Data

Aug. 28, 2018   (CN) .................... 201810986579.1
Oct. 24, 2018   (CN) .................... 201811245248.9

(51) Int. Cl.
  *H04N 5/225*   (2006.01)
  *H04N 5/232*   (2006.01)

(52) U.S. Cl.
  CPC ....... *H04N 5/2253* (2013.01); *H04N 5/23232* (2013.01)

(58) Field of Classification Search
  CPC ..................... H04N 5/2253; H04N 5/23232
  See application file for complete search history.

(56) References Cited

U.S. PATENT DOCUMENTS 9,264,625 B2 *   2/2016   Celia ................. H04N 5/2253
2007/0140677 A1   6/2007   Hsieh et al.
(Continued)

FOREIGN PATENT DOCUMENTS

CN   202998275 U   6/2013
CN   203178543 U   9/2013
(Continued)

OTHER PUBLICATIONS

The Extended European Search Report in European Application No. 19854574.1 dated Jul. 7, 2021, 6 pages
(Continued)

*Primary Examiner* — Padma Haliyur
(74) *Attorney, Agent, or Firm* — Metis IP LLC

(57) ABSTRACT

The present disclosure provides a method for adjusting a position of a photosensitive chip of an image acquisition device. The method may include determining a first symmetrical axis and a second symmetrical axis of the photosensitive chip. The first symmetrical axis may divide the photosensitive chip into a first portion and a second portion, and the second symmetrical axis may divide the photosensitive chip into a third portion and a fourth portion. The method may further include adjusting the position of the photosensitive chip from an initial position to an adjusted position. When the photosensitive chip is at the adjusted position, a first image resolution corresponding to the first portion may be substantially equal to a second image resolution corresponding to the second portion, and a third (Continued)

image resolution corresponding to the third portion may be substantially equal to a fourth image resolution corresponding to the fourth portion.

20 Claims, 16 Drawing Sheets

(56) References Cited

U.S. PATENT DOCUMENTS

| | | | | |
|---|---|---|---|---|
| 2009/0180021 | A1* | 7/2009 | Kikuchi | H04N 5/2257 348/349 |
| 2015/0070557 | A1* | 3/2015 | Petty | G03B 17/14 348/333.01 |
| 2016/0014313 | A1* | 1/2016 | Muller | H04N 5/2253 348/294 |
| 2016/0216531 | A1 | 7/2016 | Park et al. | |
| 2017/0148842 | A1 | 5/2017 | Feng et al. | |

FOREIGN PATENT DOCUMENTS

| | | |
|---|---|---|
| CN | 203397010 U | 1/2014 |
| CN | 103955109 A | 7/2014 |
| CN | 104219427 A | 12/2014 |
| CN | 205750078 U | 11/2016 |
| CN | 205864574 U | 1/2017 |
| CN | 205921660 U | 2/2017 |
| CN | 107295245 A | 10/2017 |
| CN | 207321316 U | 5/2018 |
| CN | 207380077 U | 5/2018 |
| CN | 207978027 U | 10/2018 |
| CN | 109286743 A | 1/2019 |
| EP | 2081391 A2 | 7/2009 |
| JP | 2009302837 A | 12/2009 |
| KR | 20150114361 A | 10/2015 |

OTHER PUBLICATIONS

International Search Report in PCT/CN2019/102955 dated Nov. 28, 2019, 4 Pages.

Written Opinion in PCT/CN2019/102955 dated Nov. 28, 2019, 5 Pages.

First Office Action in Chinese Application No. 201811245248.9 dated Sep. 27, 2019, 10 pages.

First Office Action in Chinese Application No. 201810986579.1 dated Oct. 27, 2021, 12 pages.

* cited by examiner

SYSTEMS AND METHODS FOR ADJUSTING POSITION OF PHOTOSENSITIVE CHIP OF IMAGE ACQUISITION DEVICE

CROSS-REFERENCE TO RELATED APPLICATIONS

This application is a continuation of International Patent Application No. PCT/CN2019/102955, filed on Aug. 28, 2019, which claims priority of Chinese Patent Application No. 201810986579.1, filed on Aug. 28, 2018, and Chinese Patent Application No. 201811245248.9, filed on Oct. 24, 2018, the contents of each of which are hereby incorporated by reference.

TECHNICAL FIELD

The present application generally relates to image acquisition technology, and more particularly, to systems and methods for adjusting a position of a photosensitive chip of an image acquisition device.

BACKGROUND

Image acquisition devices, such as surveillance cameras, have been widely used in various scenarios including, for example, photography, filming, security monitoring, real-time controlling, or the like. A photosensitive chip is a widely used component in an image acquisition device, which is mainly used to convert the received light into an electrical signal for generating an image. The imaging quality of the image acquisition device may be affected by the installation of the photosensitive chip. For example, if the photosensitive chip is in an unbalanced status, an image captured by the image acquisition device may have uneven resolutions in different portions of the image. Conventionally, the position of a photosensitive chip may need to be adjusted manually. For example, as illustrated in FIG. 4, a photosensitive chip 430 may be mounted on a housing 410 of a camera via a plurality of springs 420 and a plurality of screws 440. The screws 440 may pass through a plurality of through holes of the photosensitive chip 430 and the springs 420, and be fixed into to a plurality of columns of the housing 410. The springs 420 may encompass the columns of the housing 410 and be under a compressed state. The position of the photosensitive chip 430 may be adjusted by manually loosening or tightening the screws 440, which is inefficient, time-consuming, and complicated. Therefore, it is desirable to provide effective methods and systems for adjusting the position of a photosensitive chip of an image acquisition device, thereby improving the imaging quality of the image acquisition device.

SUMMARY

According to one aspect of the present disclosure, a system for adjusting a position of a photosensitive chip of an image acquisition device is provided. The system may include at least one storage device storing a set of instructions and at least one processor configured to communicate with the at least one storage device. When executing the set of instructions, the at least one processor is configured to direct the system to perform operations. The operations may include determining a first symmetrical axis and a second symmetrical axis of the photosensitive chip. The first symmetrical axis may be parallel with an intersection line between the photosensitive chip and a mounting base of the photosensitive chip. The first symmetrical axis may divide the photosensitive chip into a first portion and a second portion. The second symmetrical axis may be perpendicular to the first symmetrical axis at a central point of the photosensitive chip and divide the photosensitive chip into a third portion and a fourth portion. The operations may further include adjusting the position of the photosensitive chip from an initial position to an adjusted position. When the photosensitive chip is at the adjusted position, a first image resolution corresponding to the first portion may be substantially equal to a second image resolution corresponding to the second portion, and a third image resolution corresponding to the third portion may be substantially equal to a fourth image resolution corresponding to the fourth portion.

In some embodiments, to adjust the position of the photosensitive chip from an initial position to an adjusted position, the at least one processor may be configured to direct the system to perform operations. The operations may include adjusting the position of the photosensitive chip from the initial position to a first position by adjusting a first angle between the photosensitive chip and the mounting base. When the photosensitive chip is at the first position, the first image resolution may be substantially equal to the second image resolution. The operations may also include determining a first reference plane parallel with the photosensitive chip at the first position, and adjusting the position of the photosensitive chip from the first position to a second position by adjusting a second angle between the photosensitive chip and the first reference plane. When the photosensitive chip is at the second position, the third image resolution may be substantially equal to the fourth image resolution.

In some embodiments, the at least one processor may be further configured to direct the system to perform operations. The operations may include determining whether the first image resolution is substantially equal to the second image resolution when the photosensitive chip is at the second position. The operations may also include designating the second position as the adjusted position in response to a determination that the first image resolution is substantially equal to the second image resolution when the photosensitive chip is at the second position, or adjusting the position of the photosensitive chip to the adjusted position by further adjusting the first angle between the photosensitive chip and the mounting base in response to a determination that the first image resolution is not substantially equal to the second image resolution when the photosensitive chip is at the second position.

In some embodiments, to adjust the position of the photosensitive chip from an initial position to an adjusted position, the at least one processor may be further configured to direct the system to perform operations. The operations may include determining a second reference plane parallel with the photosensitive chip at the initial position. The operations may also include adjusting the position of the photosensitive chip from the initial position to a third position by adjusting a third angle between the photosensitive chip and the second reference plane. When the photosensitive chip is at the third position, the third image resolution may be substantially equal to the fourth image resolution. The operations may further include adjusting the position of the photosensitive chip from the third position to a fourth position by adjusting a first angle between the photosensitive chip and the mounting base. When the photosensitive chip is at the fourth position, the first image resolution may be substantially equal to the second image resolution.

In some embodiments, the at least one processor may be further configured to direct the system to perform operations. The operations may include determining whether the third image resolution is substantially equal to the fourth image resolution when the photosensitive chip is at the fourth position. The operations may also include designating the fourth position as the adjusted position in response to a determination that the third image resolution is substantially equal to the fourth image resolution when the photosensitive chip is at the fourth position, or adjusting the position of the photosensitive chip to the adjusted position by further adjusting the third angle between the photosensitive chip and the reference plane in response to a determination that the third image resolution is not substantially equal to the fourth image resolution when the photosensitive chip is at the fourth position.

In some embodiments, the position of the photosensitive chip may be adjusted via a position adjustment device of the photosensitive chip. The position adjustment device may include a first adjustment mechanism configured to control the photosensitive chip to rotate around a first rotation axis and a second adjustment mechanism mechanically connected to the first adjustment mechanism and configured to control the photosensitive chip to rotate around a second rotation axis. The photosensitive chip may be detachably mounted on the second adjustment mechanism. The first rotation axis may form an angle with the second rotation axis.

According to another aspect of the present disclosure, a position adjustment device for adjusting a position of a photosensitive chip of an image acquisition device is provided. The position adjustment device may include a first adjustment mechanism configured to control the photosensitive chip to rotate around a first rotation axis and a second adjustment mechanism mechanically connected to the first adjustment mechanism and configured to control the photosensitive chip to rotate around a second rotation axis. The photosensitive chip may be detachably mounted on the second adjustment mechanism. The first rotation axis may form an angle with the second rotation axis.

In some embodiments, the first adjustment mechanism may include amounting base having a first side parallel with the first rotation axis and a second side opposite to the first side of the mounting base. The first adjustment mechanism may also include a first plate having a first side parallel with the first rotation axis and a second side opposite to the first side of the first plate. The first side of the first plate may be mechanically connected to the first side of the mounting base. The first adjustment mechanism may further include a first adjustment unit mechanically connected to the second side of the mounting base and the second side of the first plate. The first adjustment unit may be configured to adjust a distance between the second side of the mounting base and the second side of the first plate such that the photosensitive chip may rotate around the first rotation axis.

In some embodiments, the first adjustment mechanism may further include a first connector configured to establish a mechanical connection between the first side of the first plate and the first side of the mounting base.

In some embodiments, the first plate, the mounting base, and the first connector may form an integral part.

In some embodiments, the first adjustment unit may include a first threaded hole located near the second side of the mounting base or the second side of the first plate and a first screw matching the first threaded hole and penetrating the first plate. The distance between the second side of the mounting base and the second side of the first plate may be adjusted via rotating the first screw.

In some embodiments, the mounting base may include a first convex part at its second side. The first plate may include a second convex part at its second side. The first adjustment unit may be mechanically connected to the first convex part and the second convex part.

In some embodiments, the first plate may further have a third side parallel with the second rotation axis and a fourth side opposite to the third side of the first plate. The second adjustment mechanism may include a second plate having a third side parallel with the second rotation axis and a fourth side opposite to the third side of the second plate. The second adjustment mechanism may also include the first plate being placed between the mounting base and the second plate. The third side of the first plate may be mechanically connected to the third side of the second plate. The second adjustment mechanism may further include a second adjustment unit mechanically connected to the fourth side of the first plate and the second side of the second plate. The second adjustment unit may be configured to adjust a distance between the fourth side of the first plate and the fourth side of the second plate such that the photosensitive chip may rotate around the second rotation axis.

In some embodiments, the second adjustment mechanism may further include a second connector configured to establish a mechanical connection between the third side of the first plate and the first side of the second plate.

In some embodiments, the first plate, the second plate, and the second connector may form an integral part.

In some embodiments, the second adjustment unit may include a second threaded hole located near the fourth side of the first plate or the fourth side of the second plate and a second screw matching the second threaded hole and penetrating the second plate. The distance between the fourth side of the first plate and the second side of the second plate may be adjusted via rotating the second screw.

In some embodiments, the first plate may include a third convex part at its fourth side. The second plate may include a fourth convex part at its fourth side. The second adjustment unit may be mechanically connected to the third convex part and the fourth convex part.

In some embodiments, to adjust the position of the photosensitive chip, a method implemented on a computing device having at least one processor and at least one storage device may be performed. The method may include determining a first symmetrical axis and a second symmetrical axis of the photosensitive chip. The first symmetrical axis may be parallel with an intersection line between the photosensitive chip and the mounting base of the photosensitive chip. The first symmetrical axis may divide the photosensitive chip into a first portion and a second portion. The second symmetrical axis may be perpendicular to the first symmetrical axis at a central point of the photosensitive chip and divide the photosensitive chip into a third portion and a fourth portion. The method may further include adjusting the position of the photosensitive chip from an initial position to an adjusted position using the position adjustment device. When the photosensitive chip is at the adjusted position, a first image resolution corresponding to the first portion may be substantially equal to a second image resolution corresponding to the second portion, and a third image resolution corresponding to the third portion may be substantially equal to a fourth image resolution corresponding to the fourth portion.

In some embodiments, to adjust the position of the photosensitive chip from an initial position to an adjusted position, the method may include adjusting the position of the photosensitive chip from the initial position to a first position by adjusting a first angle between the photosensitive chip and the mounting base using the first adjustment mechanism. When the photosensitive chip is at the first position, the first image resolution may be substantially equal to the second image resolution. The method may also include determining a first reference plane parallel with the photosensitive chip at the first position. The method may further include adjusting the position of the photosensitive chip from the first position to a second position by adjusting a second angle between the photosensitive chip and the first reference plane using the second adjustment mechanism. When the photosensitive chip is at the second position, the third image resolution may be substantially equal to the fourth image resolution.

In some embodiments, to adjust the position of the photosensitive chip from an initial position to an adjusted position, the method may include determining a second reference plane parallel with the photosensitive chip at the initial position. The method may also include adjusting the position of the photosensitive chip from the initial position to a third position by adjusting a third angle between the photosensitive chip and the reference plane using the second adjustment mechanism. When the photosensitive chip is at the third position, the third image resolution may be substantially equal to the fourth image resolution. The method may further include adjusting the position of the photosensitive chip from the third position to a fourth position by adjusting a first angle between the photosensitive chip and the mounting base using the first adjustment mechanism. When the photosensitive chip is at the fourth position, the first image resolution may be substantially equal to the second image resolution.

According to still another aspect of the present disclosure, a method for adjusting a position of a photosensitive chip of an image acquisition device is provided. The method may be implemented on a computing device including a processor and a storage device. The method may include determining a first symmetrical axis and a second symmetrical axis of the photosensitive chip. The first symmetrical axis may be parallel with an intersection line between the photosensitive chip and a mounting base of the photosensitive chip. The first symmetrical axis may divide the photosensitive chip into a first portion and a second portion. The second symmetrical axis may be perpendicular to the first symmetrical axis at a central point of the photosensitive chip and divide the photosensitive chip into a third portion and a fourth portion. The method may further include adjusting the position of the photosensitive chip from an initial position to an adjusted position. When the photosensitive chip is at the adjusted position, a first image resolution corresponding to the first portion may be substantially equal to a second image resolution corresponding to the second portion, and a third image resolution corresponding to the third portion may be substantially equal to a fourth image resolution corresponding to the fourth portion.

According to still another aspect of the present disclosure, a non-transitory computer readable medium including executable instructions is provided. When executed by at least one processor, the executable instructions may direct the at least one processor to perform a method. The method may include determining a first symmetrical axis and a second symmetrical axis of the photosensitive chip. The first symmetrical axis may be parallel with an intersection line between the photosensitive chip and a mounting base of the photosensitive chip. The first symmetrical axis may divide the photosensitive chip into a first portion and a second portion. The second symmetrical axis may be perpendicular to the first symmetrical axis at a central point of the photosensitive chip and divide the photosensitive chip into a third portion and a fourth portion. The method may further include adjusting the position of the photosensitive chip from an initial position to an adjusted position. When the photosensitive chip is at the adjusted position, a first image resolution corresponding to the first portion may be substantially equal to a second image resolution corresponding to the second portion, and a third image resolution corresponding to the third portion may be substantially equal to a fourth image resolution corresponding to the fourth portion.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Figure 2:
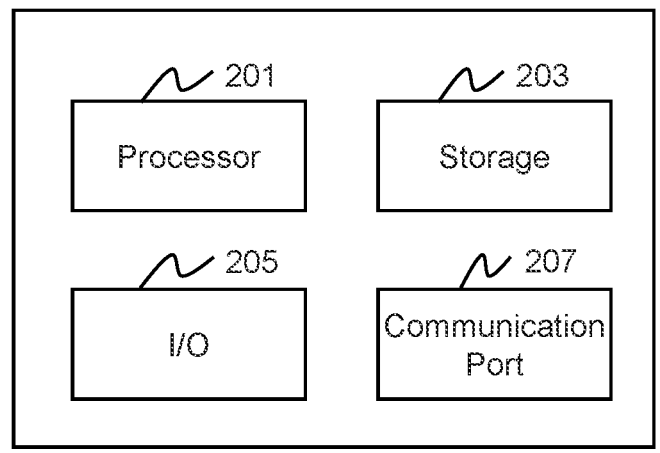
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 201 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context dearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context dearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Spatial and functional relationships between elements (for example, between layers) are described using various terms, including "connected," "engaged," "interfaced," and "coupled." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. In addition, a spatial and functional relationship between elements may be achieved in various ways. For example, a mechanical connection between two elements may include a welded connection, a key connection, a pin connection, an interference fit connection, or the like, or any combination thereof. Other words used to describe the relationship between elements should be interpreted in a like fashion (e.g., "between," versus "directly between," "adjacent," versus "directly adjacent," etc.).

An aspect of the present disclosure relates to systems and methods for adjusting a position of a photosensitive chip of an image acquisition device. The systems and methods may determine a first symmetrical axis and a second symmetrical axis of the photosensitive chip. The first symmetrical axis may be parallel with an intersection line between the photosensitive chip and a mounting base of the photosensitive chip and may divide the photosensitive chip into a first portion and a second portion. The second symmetrical axis may be perpendicular to the first symmetrical axis at a central point of the photosensitive chip and may divide the photosensitive chip into a third portion and a fourth portion. The systems and methods may also adjust the position of the photosensitive chip from an initial position to an adjusted position. When the photosensitive chip is located at the adjusted position, the photosensitive chip may be in a balanced status. For example, a first image resolution corresponding to the first portion may be substantially equal to a second image resolution corresponding to the second portion, and/or a third image resolution corresponding to the third portion may be substantially equal to a fourth image resolution corresponding to the fourth portion.

Another aspect of the present disclosure relates to a position adjustment device for adjusting the position of the photosensitive chip of the image acquisition device. The position adjustment device may include a first adjustment mechanism configured to control the photosensitive chip to rotate around a first rotation axis and a second adjustment mechanism mechanically connected to the first adjustment mechanism and configured to control the photosensitive chip to rotate around a second rotation axis. In some embodiments, the photosensitive chip may be detachably mounted on the second adjustment mechanism. The first rotation axis may form an angle with the second rotation axis. The systems and methods disclosed herein may be used to adjust the position of the photosensitive chip using the position adjustment device.

According to some embodiments provided in the present disclosure, the position of the photosensitive chip may be adjusted automatically (e.g., by using the position adjustment device) to reach a balanced status. This may be more efficient and time-saving compared with adjusting the position of the photosensitive chip manually. In addition, when the photosensitive chip is in a balanced status, an image captured using the photosensitive chip may have a uniform image resolution in different portions of the image, thereby improving the imaging quality of the image acquisition device.

Figure 1:
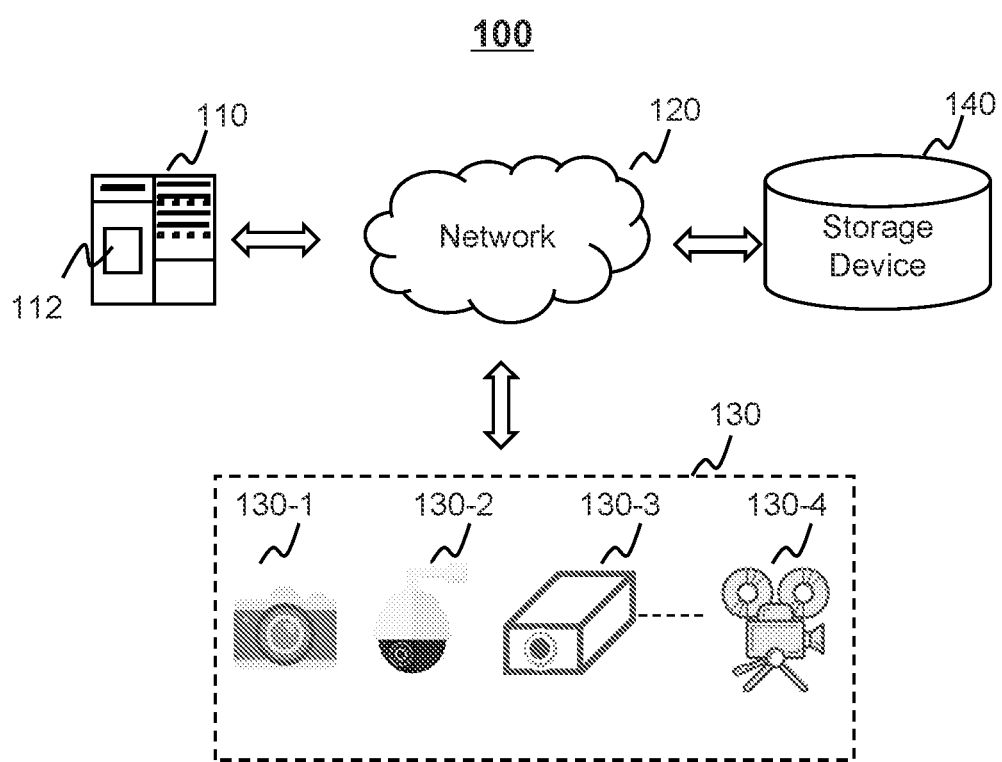
FIG. 1 is a schematic diagram of an exemplary image acquisition system according to some embodiments of the present disclosure.

FIG. 1 illustrates a schematic diagram of an exemplary image acquisition system 100 according to some embodiments of the present disclosure. As shown, the image acquisition system 100 may include a server 110, a network 120, an image acquisition device 130, and a storage device 140. The image acquisition system 100 may be used in various fields including, for example, photography, filming, monitoring, and detection.

The server 110 may process information and/or data relating to the image acquisition system 100 to perform one or more functions described in the present disclosure. For example, the server 110 may process image data acquired by the image acquisition device 130 to determine a position parameter of a photosensitive chip (e.g., an angle between the photosensitive chip and a certain plane) of the image acquisition device 130. As another example, the server 110 may actuate a position adjustment device to adjust the position of the photosensitive chip. The server 110 may be a single server or a server group. The server group may be centralized, or distributed (e.g., the server 110 may be a distributed system). In some embodiments, the server 110 may be local or remote. For example, the server 110 may access information and/or data stored in the image acquisition device 130 and/or the storage device 140 via the network 120. As another example, the server 110 may be directly connected to the image acquisition device 130 and/or the storage device 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 (or a portion thereof) may be implemented on a computing device 200 having one or more components illustrated in FIG. 2 of the present disclosure.

In some embodiments, the server 110 may include a processing device 112. According to some embodiments of the present disclosure, the processing device 112 may process information and/or data related to the image acquisition system 100 to perform one or more functions described in the present disclosure. For example, the processing device 112 may determine a position parameter of a photosensitive chip of the image acquisition device 130 by analyzing image data captured by the image acquisition device 130. The processing device 112 may further control a position adjustment device of the photosensitive chip to adjust a position of the photosensitive chip according to the determined position parameter.

In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may include any suitable network that can facilitate exchange of information and/or data for the image acquisition system 100. In some embodiments, one or more components in the image acquisition system 100 (e.g., the server 110, the image acquisition device 130, and the storage device 140) may send information and/or data to another component(s) in the image acquisition system 100 via the network 120. For example, the server 110 may obtain an image from the image acquisition device 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

The image acquisition device 130 may be and/or include any suitable device that is capable of acquiring image data. Exemplary image acquisition device 130 may include a camera (e.g., a digital camera, an analog camera, an IP camera (IPC), etc.), a video recorder, a scanner, a mobile phone, a tablet computing device, a wearable computing device, an infrared imaging device (e.g., a thermal imaging device), or the like. In some embodiments, the image acquisition device 130 may include a digital camera 130-1, a dome camera 130-2, an integrated camera 130-3, a binocular camera 130-4, a monocular camera, etc. In some embodiments, the image acquisition device 130 may include a photosensitive chip for sensing light and optionally a position adjustment device of the photosensitive chip. The position adjustment device may be used to adjust a position of the photosensitive chip. More descriptions regarding the photosensitive chip and/or the position adjustment device may be found elsewhere in the present disclosure. See, e.g., FIGS. 5-13 and relevant descriptions thereof.

The image data acquired by the image acquisition device 130 may include an image, a video, and/or any related image data, such as values of one or more pixels (or referred to as pixel values) of an image (e.g., luma, gray values, intensities, chrominance, contrast of one or more pixels of an image), RGB data, audio information, timing information, location data, etc. In some embodiments, the image acquisition device 130 may include a charge-coupled device (CCD), a complementary metal-oxide-semiconductor (CMOS) sensor, an N-type metal-oxide-semiconductor (NMOS), a contact image sensor (CIS), and/or any other suitable image sensor.

In some embodiments, the image data acquired by the image acquisition device 130 may be displayed on a terminal device (not shown in FIG. 1). The terminal device may include a tablet computer, a laptop computer, a mobile phone, a personal digital assistant (PDA), a smart watch, a point of sale (POS) device, a virtual reality (VR), an augmented reality (AR), an onboard computer, an onboard television, a wearable device, or the like, or any combination thereof.

The storage device 140 may store data and/or instructions. The data and/or instructions may be obtained from, for example, the server 110, the image acquisition device 130, and/or any other component of the image acquisition system 100. For example, the storage device 140 may store image data acquired by the image acquisition device 130 and/or one or more images generated by the processing device 112. In some embodiments, the storage device 140 may store data and/or instructions that the server 110 (e.g., the processing device 112) may execute or use to perform exemplary methods described in the present disclosure. In some embodiments, the storage device 140 may include a mass storage device, a removable storage device, a volatile read-and-write memory, a read-only memory (ROM), or the like, or any combination thereof. Exemplary mass storage devices may include a magnetic disk, an optical disk, a solid-state drives, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 120 to communicate with one or more components of the image acquisition system 100 (e.g., the server 110, the image acquisition device 130, etc.). One or more components of the image acquisition system 100 may access the data or instructions stored in the storage device 140 via the network 120. In some embodiments, the storage device 140 may be directly connected to or communicate with one or more components of the image acquisition system 100 (e.g., the server 110, the image acquisition device 130, etc.). In some embodiments, the storage device 140 may be part of the server 110 or the image acquisition device 130.

In some embodiments, one or more components of the image acquisition system 100 (e.g., the server 110, the image acquisition device 130, etc.) may have a permission to access the storage device 140. In some embodiments, one or more components of the image acquisition system 100 may read and/or modify information stored in the storage device 140 when one or more conditions are met.

It should be noted that the above description is merely provided for the purposes of illustration, and not intended to limit the scope of the present disclosure. For persons having ordinary skills in the art, multiple variations and modifications may be made under the teachings of the present disclosure. In some embodiments, the image acquisition system 100 may include one or more additional components and/or one or more components of the image acquisition system 100 described above may be omitted. For example, the image acquisition system 100 may include one or more terminal devices. Additionally or alternatively, two or more components of the image acquisition system 100 may be integrated into a single component. For example, the processing device 112 may be integrated into the image acquisition device 130. A component of the image acquisition system 100 may be implemented on two or more sub-components. However, those variations and modifications do not depart from the scope of the present disclosure.

FIG. 2 is a schematic diagram illustrating exemplary hardware and/or software components of a computing device 200 according to some embodiments of the present disclosure. The computing device 200 may be used to implement any component of the image acquisition system 100 as described herein. For example, the server 110 (e.g., the processing device 112) and/or the image acquisition device 130 may be implemented on the computing device 200, via its hardware, software program, firmware, or a combination thereof. Although only one such computing device is shown, for convenience, the computer functions relating to the image acquisition system 100 as described herein may be implemented in a distributed fashion on a number of similar platforms, to distribute the processing load.

As illustrated in FIG. 2, the computing device 200 may include a processor 201, a storage 203, an input/output (I/O) 205, and a communication port 207. The processor 201 may execute computer instructions (e.g., program code) and perform functions of the image acquisition system 100 in accordance with techniques as described elsewhere in the present disclosure. The computer instructions may include, for example, routines, programs, objects, components, data structures, procedures, modules, and functions, which perform particular functions as described elsewhere in the present disclosure. For example, the processor 201 may execute instructions to adjust the position of a photosensitive chip of the image acquisition device 130 such that the photosensitive chip reaches a balanced status. In some embodiments, the processor 201 may include interface circuits and processing circuits therein. The interface circuits may be configured to receive electronic signals from the communication port 207, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the communication port 207.

In some embodiments, the processor 201 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor may be described in the computing device 200. However, it should be noted that the computing device 200 of the present disclosure may also include multiple processors, and thus operations and/or method steps that are performed by one processor as described in the present disclosure may also be jointly or separately performed by the multiple processors. For example, if in the present disclosure the processor of the computing device 200 executes both operations A and operation B, it should be understood that operation A and operation B may also be performed by two or more different processors jointly or separately in the computing device 200 (e.g., a first processor executes operation A and a second processor executes operation B, or vice versa, or the first and second processors jointly execute operations A and B).

The storage 203 may store data/information obtained from the server 110, the image acquisition device 130, and/or any other component of the image acquisition system 100. In some embodiments, the storage 203 may include amass storage device, a removable storage device, a volatile read-and-write memory, a read-only memory (ROM), or the like, or any combination thereof. In some embodiments, the storage 203 may store one or more programs and/or instructions to perform exemplary methods described in the present disclosure. For example, the storage 203 may store a program for adjusting the position of a photosensitive chip of an image acquisition device from an initial position to an adjusted position.

The I/O 205 may input and/or output signals, data, information, etc. In some embodiments, the I/O 205 may enable a user interaction with the computing device 200. In some embodiments, the I/O 205 may include or communicate with an input device and an output device to facilitate communication between the computing device 200 and an input device or an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 207 may be connected to a network (e.g., the network 120) to facilitate data communications. The communication port 207 may establish connections between the computing device 200 and one or more other components of the image acquisition system 100 or an external source. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 207 may be and/or include a standardized communication port, such as RS232, RS485, etc. In some embodiments, the communication port 207 may be a specially designed communication port.

Figure 3:
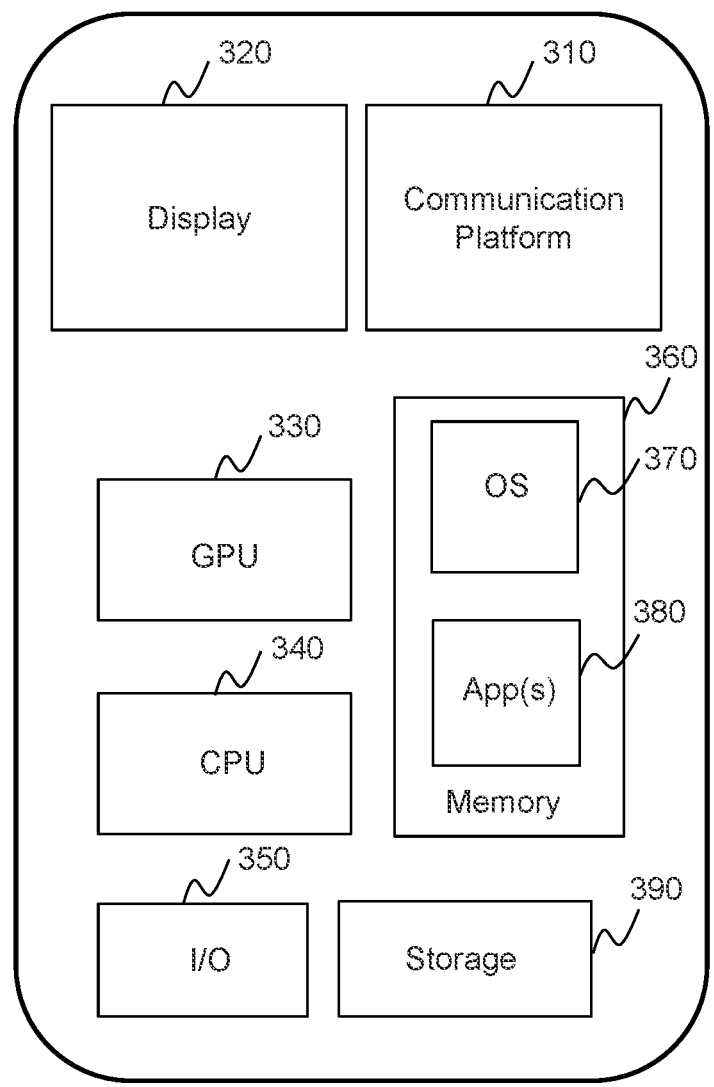
FIG. 3 is a schematic diagram illustrating exemplary hardware and/or software components of a mobile device according to some embodiments of the present disclosure.
Figure 4:
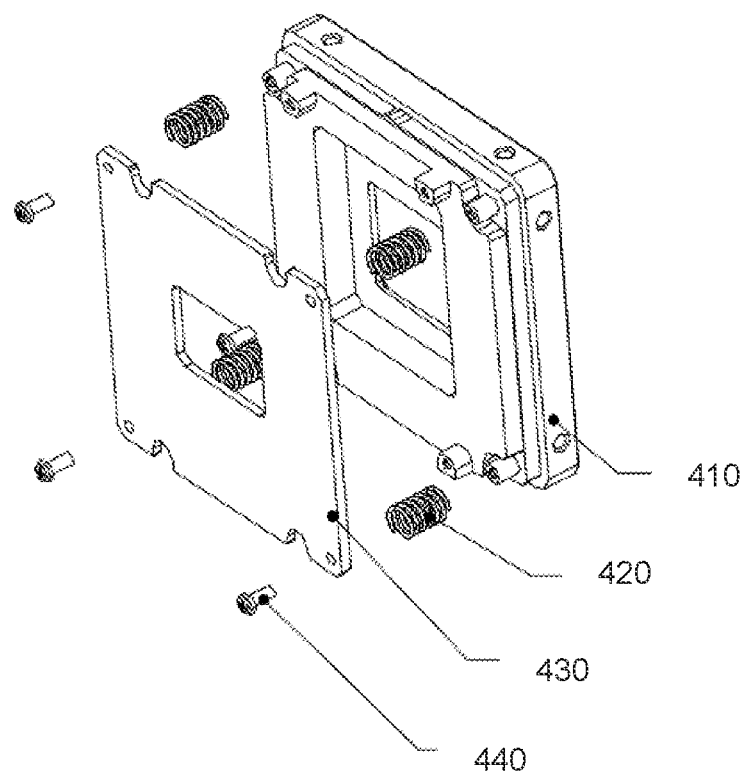
FIG. 4 is a schematic diagram illustrating a portion of an exemplary camera according to some embodiments of the present disclosure.

FIG. 3 is a schematic diagram illustrating exemplary hardware and/or software components of a mobile device 300 according to some embodiments of the present disclosure. In some embodiments, one or more components (e.g., a terminal device not shown in figures, the processing device 112, and/or the image acquisition device 130) of the image acquisition system 100 may be implemented on the mobile device 300.

As illustrated in FIG. 3, the mobile device 300 may include a communication port 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the image acquisition system 100. User interactions with the information stream may be achieved via the I/O 350 and provided to the image acquisition system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 5:
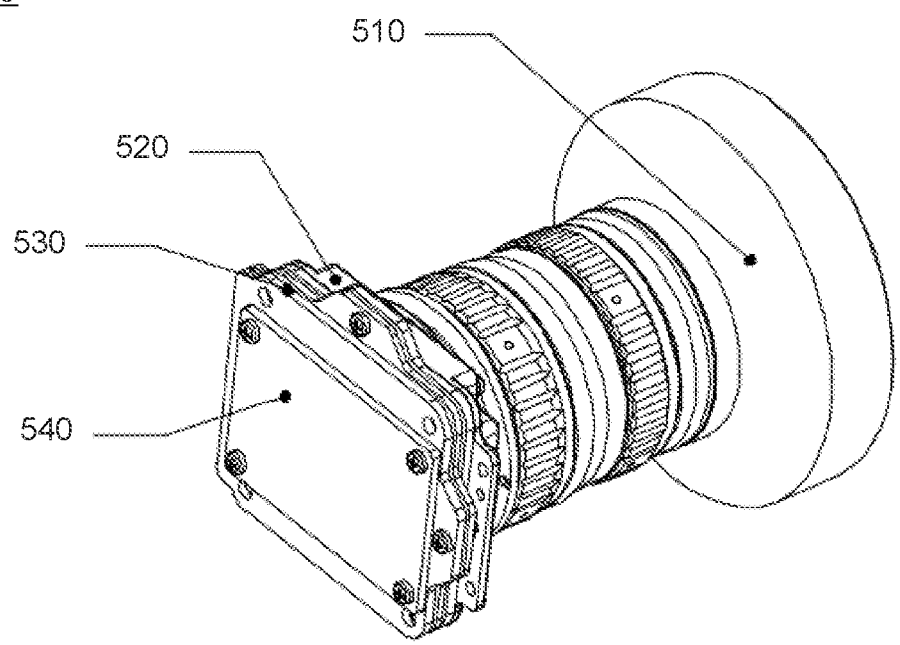
FIG. 5 is a schematic diagram illustrating an exemplary camera according to some embodiments of the present disclosure.

FIG. 5 is a schematic diagram illustrating an exemplary camera 500 according to some embodiments of the present disclosure. The camera 500 may be an exemplary embodiment of the image acquisition device 130 as described in connection with FIG. 1. In some embodiments, the camera 500 may be of any type of camera. Exemplary types of a camera may include a digital camera, a dome camera, a board camera, a bullet camera, a box camera, a zoom camera, a water-resistant camera, an infrared camera, or the like.

As illustrated in FIG. 5, the camera 500 may include a lens 510, a camera housing 520, a position adjustment device 530, and a photosensitive chip 540. The lens 510 may be mechanically connected to the camera housing 520. The position adjustment device 530 may be mounted between the camera housing 520 and the photosensitive chip 540. In operation, incoming light in a scene to be photographed may pass through the lens 510 and further hit the photosensitive chip 540. The photosensitive chip 540 may capture the incoming light and generate an image (or image data) of the scene based on the captured incoming light. In some embodiments, the photosensitive chip 540 may include any photosensitive component (e.g., an image sensor), such as a charge-coupled device (CCD), a complementary metal-oxide semiconductor (CMOS), or the like.

In some embodiments, the imaging quality of the camera 500 may be associated with the position of the photosensitive chip 540. For example, the imaging quality of the camera 500 may be higher when the photosensitive chip 540 is in a balanced status than that when the photosensitive chip 540 is in an imbalanced status. In some embodiments, the photosensitive chip 540 may be deemed as in a balanced status if a position parameter of the photosensitive chip 540 satisfies a certain condition. Merely by way of example, if an angle between the photosensitive chip 540 and a certain plane (e.g., a front plane of the lens 510) is smaller than a threshold angle, the photosensitive chip 540 may be regarded as in a balanced status. As another example, the photosensitive chip 540 may be divided into a plurality of portions. If the distance between each of the plurality of portions and the lens 510 is smaller than a threshold distance, the photosensitive chip 540 may be regarded as in a balanced status. In some embodiments, the photosensitive chip 540 may have a symmetrical structure. For example, the photosensitive chip 540 may have two portions symmetrical to each other with respect to a symmetrical axis. If an imaging parameter (e.g., an image resolution) of one of the two portions is substantially equal to that of the other portion, the photosensitive chip 540 may be deemed as in a balanced status.

In some embodiments, the position of the photosensitive chip 540 may be adjusted by the position adjustment device 530. For example, as shown in FIG. 5, the photosensitive chip 540 may be detachably mounted on the position adjustment device 530. In operation, the position adjustment device 530 may adjust the position of the photosensitive chip 540 continuously or intermittently (e.g., periodically or irregularly). Alternatively, the position adjustment device 530 may adjust the position of the photosensitive chip 540 in response to a user command or request inputted by a user of the camera 500. In some embodiments, one or more operations in process 1500 as described in connection with FIG. 15 may be performed to adjust the photosensitive chip 540 to reach a balanced status using the position adjustment device 530.

In some embodiments, the position adjustment device 530 may include one or more adjustment mechanisms, each of which may be configured to control the photosensitive chip 540 to rotate around a rotation axis. More descriptions regarding the one or more adjustment mechanisms may be found elsewhere in the present disclosure. See, e.g., FIG. 7 and relevant descriptions thereof.

Figure 6:
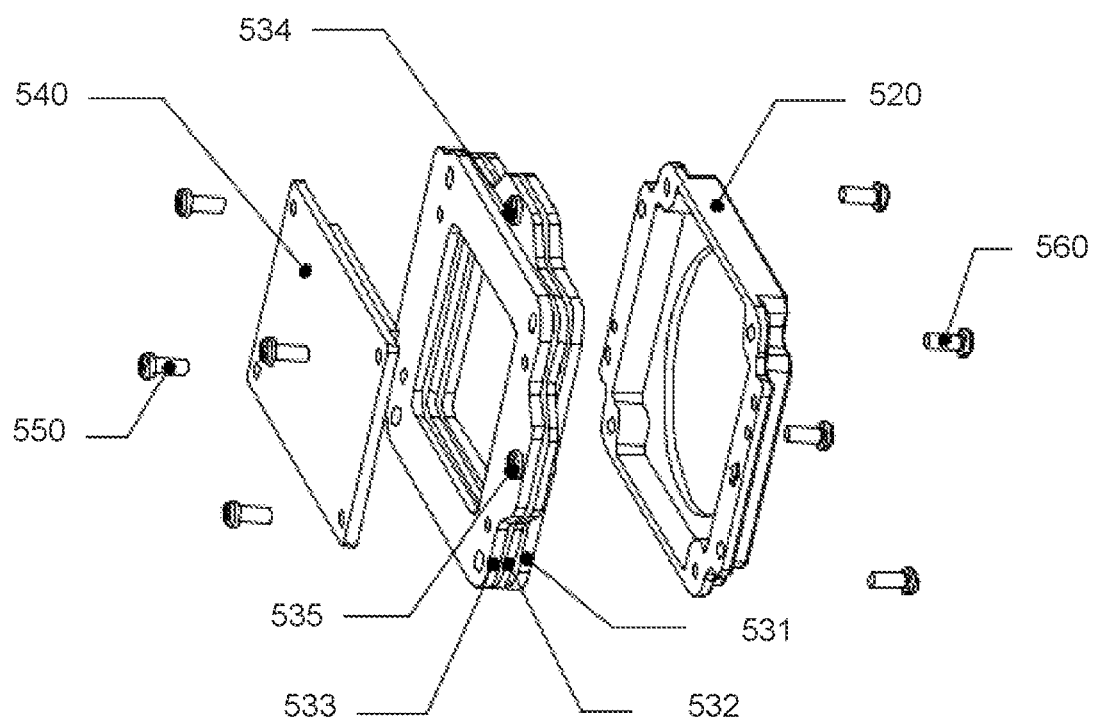
FIG. 6 is an exploded diagram of a portion of the camera illustrated in FIG. 5 according to some embodiments of the present disclosure.

FIG. 6 is an exploded diagram of a portion of the camera 500 according to some embodiments of the present disclosure.

As shown in FIG. 6, the position adjustment device 530 may include a mounting base 531, a first plate 532, a second plate 533, a first adjustment unit 534, and a second adjustment unit 535. The first plate 532 may be placed between the mounting base 531 and the second plate 533. The mounting base 531 may be detachably connected to the camera housing 520 via a plurality of mounting screws 560. The photosensitive chip 540 may be detachably mounted on the second plate 533 via a plurality of mounting screws 550. In some embodiments, the mounting screws 560 and/or the mounting screws 550 may be replaced by one or more other mounting mechanisms. More descriptions regarding the position adjustment device 530 described above may be found elsewhere in the present disclosure. See, e.g., FIG. 7 and relevant descriptions thereof.

It should be noted that the example illustrated in FIGS. 5 and 6 and the above descriptions thereof are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the camera 500 may include one or more additional components and/or one or more components of the camera 500 described above may be omitted. Additionally or alternatively, two or more components of the camera 500 may be integrated into a single component. A component of the camera 500 may be implemented on two or more sub-components.

In addition, the position, the shape, and/or the size of a component of the camera 500 as shown in FIGS. 5 and 6 are illustrative, and the component may be mounted at any position and have any size and/or shape. Moreover, a mechanical connection between two components as illustrated in figures and described above may be variable. For example, a mechanical connection between two components may include a welded connection, a key connection, a pin connection, an interference fit connection, or the like, or any combination thereof.

Figure 7:
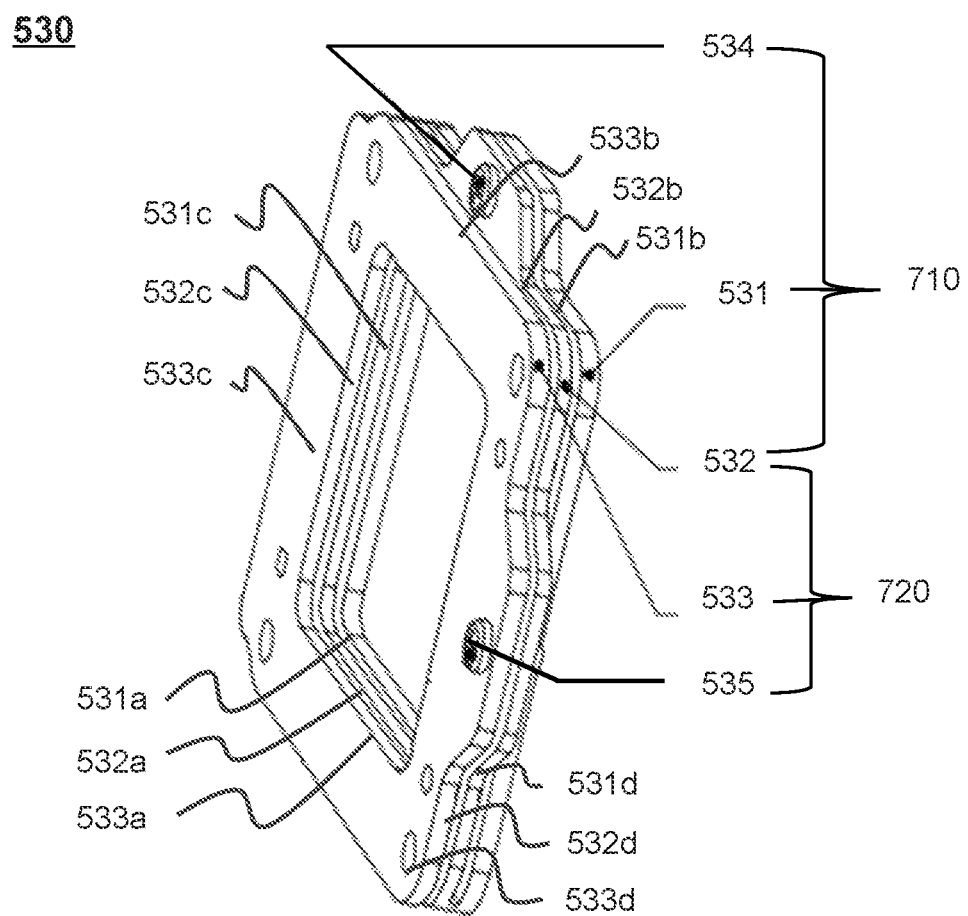
FIG. 7 is a schematic diagram illustrating an exemplary position adjustment device of a photosensitive chip according to some embodiments of the present disclosure.
Figure 8:
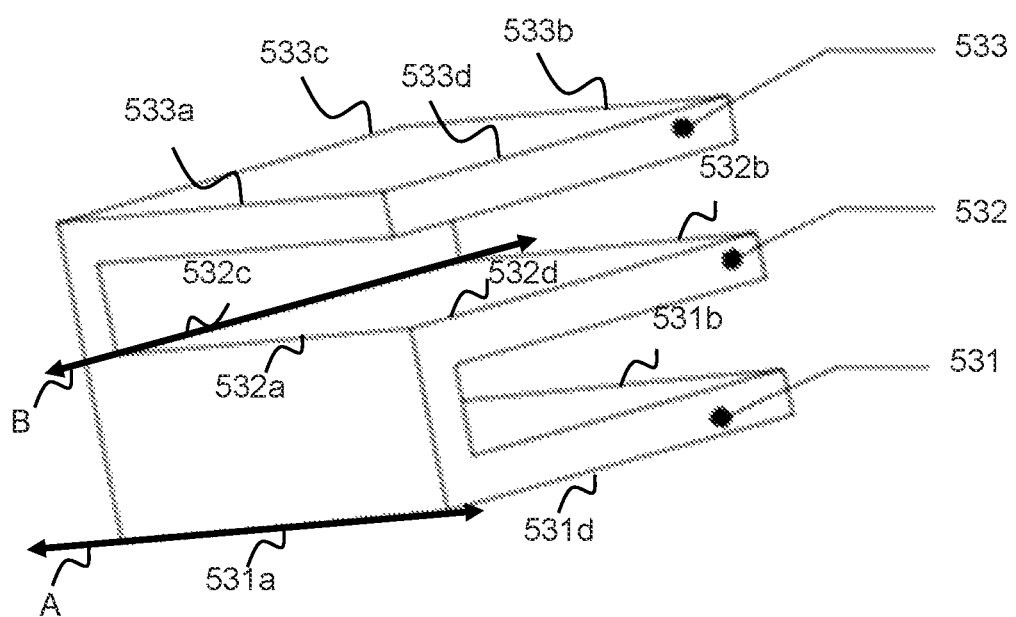
FIG. 8 is a schematic diagram illustrating an exemplary position adjustment device of a photosensitive chip according to some embodiments of the present disclosure.

FIGS. 7 and 8 are schematic diagrams illustrating an exemplary position adjustment device 530 of a photosensitive chip according to some embodiments of the present disclosure.

The position adjustment device 530 may be configured to adjust a position of the photosensitive chip (e.g., the photosensitive chip 540 as described in connection with FIG. 5). As shown in FIGS. 7 and 8, the position adjustment device 530 may include a mounting base 531, a first plate 532, a second plate 533, a first adjustment unit 534, and a second adjustment unit 535. The first plate 532 may be placed between the mounting base 531 and the second plate 533. In some embodiments, the photosensitive chip may be detachably mounted on the second plate 533 via, for example, a mounting screw (e.g., the mounting screws 550 as described in connection with FIG. 6).

Figure 9A:
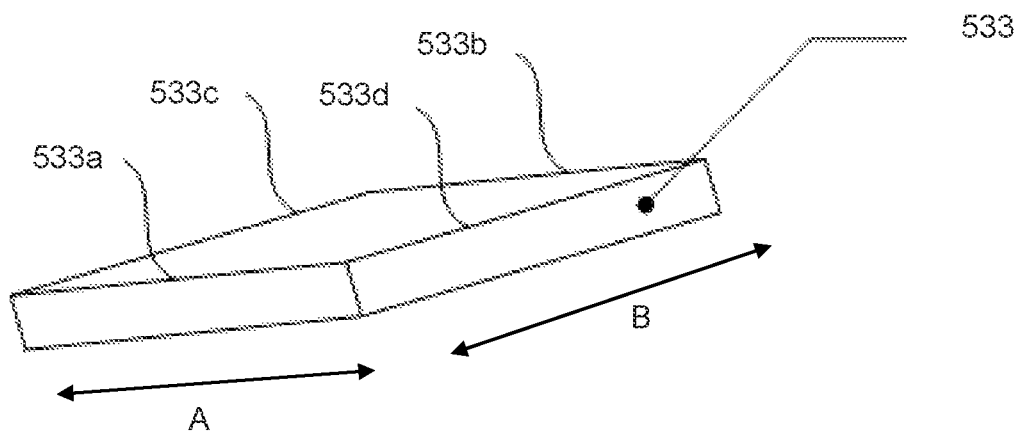
FIG. 9A is a schematic diagram illustrating an exemplary second plate according to some embodiments of the present disclosure.

In some embodiments, the mounting base 531, the first plate 532, and the second plate 533 may have any shape and/or size. Merely by way of example, as shown in FIGS. 8 and 9A, the second plate 533 may be a quadrangle having a first side 533a, a second side 533b, a third side 533c, and a fourth side 533d. The second side 533b may be opposite to the first side 533a, and the third side 533c may be opposite to the fourth side 533d. In some embodiments, the first side 533*a* and the second side 533*b* may be parallel with each other and extend along a first rotation axis (e.g., which is parallel with a direction A in FIGS. 8 and 9A). The third side 533*c* and the fourth side 533*d* may be parallel with each other and extend along a second rotation axis (e.g., which is parallel with a direction B as shown in FIGS. 8 and 9A). In some alternative embodiments, the first side 533*a* and the second side 533*b* may be unparallel with each other. For example, the first side 533*a* may be parallel with the first rotation axis, and the second side 533*b* may form an angle (e.g., a sharp angle) with the first rotation axis. Additionally or alternatively, the third side 533*c* and the fourth side 533*d* may be unparallel with each other. For example, the third side 533*c* may be parallel with the second rotation axis, and the fourth side 533*d* may form an angle (e.g., a sharp angle) with the second rotation axis.

Figure 9B:
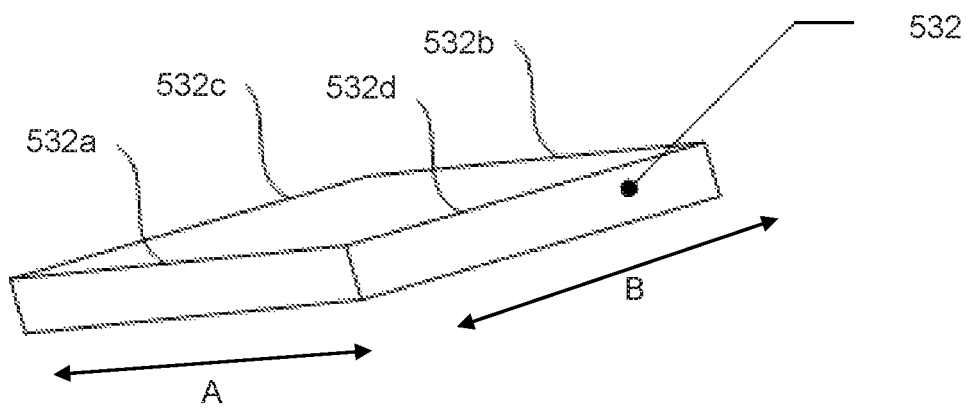
FIG. 9B is a schematic diagram illustrating an exemplary first plate according to some embodiments of the present disclosure.
Figure 9C:
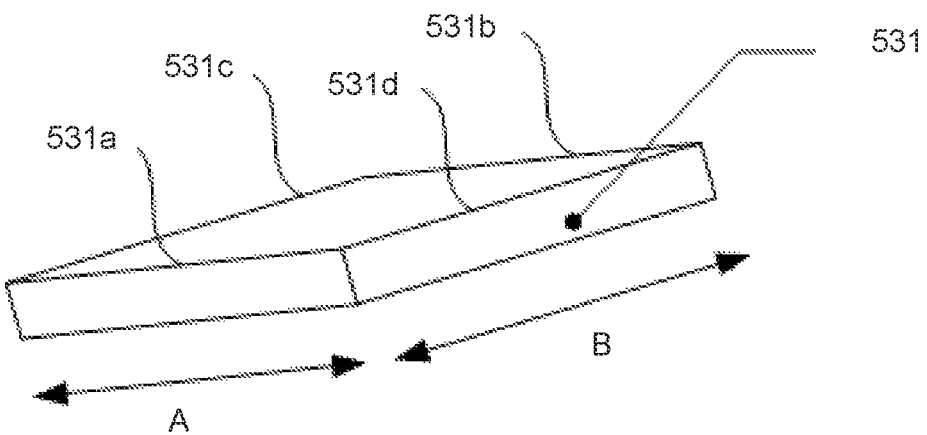
FIG. 9C is a schematic diagram illustrating an exemplary mounting base according to some embodiments of the present disclosure.

As shown in FIGS. 8 and 9B, the first plate 532 may be a quadrangle having a first side 532*a*, a second side 532*b* opposite to the first side 532*a*, a third side 532*c*, and a fourth side 532*d* opposite to the third side 532*c*. Similar to the second plate 533 aforementioned, two opposite sides of the first plate 532 (e.g., the first side 532*a* and the second side 532*b*, or the third side 532*c* and the fourth side 532*d*) may be parallel or unparallel with each other. As shown in FIGS. 8 and 9C, the mounting base 531 may be a quadrangle having a first side 531*a*, a second side 531*b* opposite to the first side 531*a*, a third side 531*c*, and a fourth side 531*d* opposite to the third side 531*c*. Similar to the second plate 533 and/or the first plate 532 as aforementioned, two opposite sides of the mounting base 531 (e.g., the first side 531*a* and the second side 531*b*, or the third side 531*c* and the fourth side 531*d*) may be parallel or unparallel with each other.

In some embodiments, the mounting base 531, the first plate 532, and the second plate 533 may have a same shape or different shapes. For example, the mounting base 531, the first plate 532, and the second plate 533 may both be a rectangle or a square having a same size. As another example, the mounting base 531, the first plate 532, and the second plate 533 may have a same shape but have different sizes.

In some embodiments, as shown in FIG. 8, the first side 532*a* of the first plate 532 and the first side 531*a* of the mounting base 531 may be mechanically connected to each other. For example, a first connector may establish a mechanical connection between the first side 532*a* of the first plate 532 and the first side 531*a* of the mounting base 531. Optionally, the first plate 532, the mounting base 531, and the first connector may form an integral part, e.g., a U-shape part having an opening at the second sides of the first plate 532 and the mounting base 531. In some embodiments, the mounting base 531 may be perpendicular to the first connector, and/or the first plate 532 may be perpendicular to the first connector.

Additionally or alternatively, the third side 532*c* of the first plate 532 and the third side 533*c* of the second plate 533 may be mechanically connected to each other. For example, a second connector may establish a mechanical connection between the third side 532*c* of the first plate 532 and the third side 533*c* of the second plate 533. Optionally, the first plate 532, the second plate 533, and the second connector may form an integral part, e.g., a U-shape part having an opening at the fourth sides of the first plate 532 and the second plate 533. In some embodiments, the second plate 533 may be perpendicular to the second connector, and/or the first plate 532 may be perpendicular to the second connector.

In some embodiments, as illustrated in FIG. 7, the position adjustment device 530 may include a first adjustment unit 534, which in combination with the first plate 532 and the mounting base 531 forma first adjustment mechanism 710. The first adjustment mechanism 710 may be configured to control the photosensitive chip to rotate around the first rotation axis so as to adjust the position of the photosensitive chip. For example, the first adjustment unit 534 may be mechanically connected to the second side 531*b* of the mounting base 531 and the second side 532*b* of the first plate 532. The first adjustment unit 534 may be configured to adjust a distance between the second side 531*b* of the mounting base 531 and the second side 532*b* of the first plate 532 such that the photosensitive chip may rotate around the first rotation axis. More descriptions regarding the first adjustment unit 534 may be found elsewhere in the present disclosure. See, e.g., FIGS. 10-13 and relevant descriptions thereof. In some embodiments, as shown in FIG. 7, the mounting base 531 may include a first convex part at its second side 531*b*, and the first plate 532 may include a second convex part at its second side 532*b*. The first adjustment unit 534 may be mechanically connected to the first convex part of the mounting base 531 and the second convex part of the first plate 532. In this way, the first adjustment unit 534 may adjust the position of the photosensitive chip without affecting the second plate 533, which improves the convenience of operating the first adjustment unit 534.

Additionally or alternatively, as illustrated in FIG. 7, the position adjustment device 530 may include a second adjustment unit 535, which in combination with the first plate 532 and the second plate 533 form a second adjustment mechanism 720. The second adjustment mechanism 720 may be configured to control the photosensitive chip to rotate around the second rotation axis so as to adjust the position of the photosensitive chip. For example, the second adjustment unit 535 may be mechanically connected to the fourth side 532*d* of the first plate 532 and the fourth side 533*d* of the second plate 533. The second adjustment unit 535 may be configured to adjust a distance between the fourth side 532*d* of the first plate 532 and the fourth side 533*d* of the second plate 533 such that the photosensitive chip may rotate around the second rotation axis. More descriptions regarding the second adjustment unit 535 may be found elsewhere in the present disclosure. See, e.g., FIGS. 10-13 and relevant descriptions thereof. In some embodiments, as shown in FIG. 7, the first plate 532 may include a third convex part at its fourth side 532*d*, and the second plate 533 may include a fourth convex part at its fourth side 533*d*. The second adjustment unit 535 may be mechanically connected to the third convex part of the first plate 532 and the fourth convex part of the second plate 533. In this way, the second adjustment unit 535 may adjust the position of the photosensitive chip without affecting the mounting base 531, which improves the convenience of operating the second adjustment unit 535.

Figure 10:
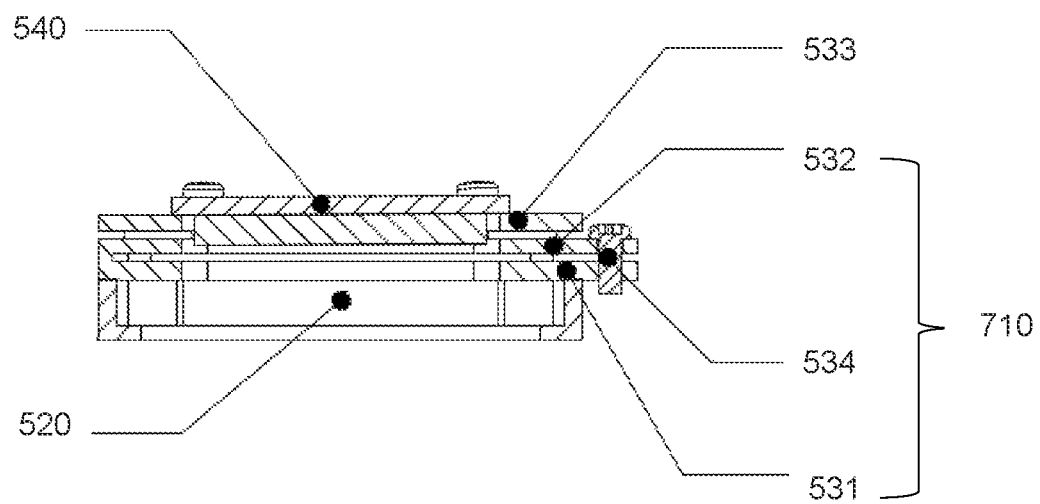
FIG. 10 illustrates a side view of an exemplary first adjustment mechanism according to some embodiments of the present disclosure.

FIG. 10 illustrates a side view of an exemplary first adjustment mechanism 710 according to some embodiments of the present disclosure.

As shown in FIG. 10, the first adjustment mechanism 710 may include the mounting base 531, the first plate 532, and the first adjustment unit 534. The side view of the first adjustment mechanism 710 illustrated in FIG. 10 may be seen from the direction facing the fourth sides of the mounting base 531 and the first plate 532. The first plate 532 may be placed between the mounting base 531 and the second plate 533. The mounting base 531 may be detachably connected to the camera housing 520. The photosensitive chip 540 may be detachably mounted on the second plate 533.

In some embodiments, the first adjustment unit 534 may be mechanically connected to a second side (e.g., the second side 531b as described in connection with FIGS. 7-9C) of the mounting base 531 and a second side (e.g., the second side 532b as described in connection with FIGS. 7-9C) of the first plate 532. For example, the mounting base 531 may include a first convex part at its second side, and the first plate 532 may include a second convex part at its second side. The first adjustment unit 534 may be mechanically connected to the first convex part and the second convex part.

In some embodiments, the first adjustment unit 534 may include any mechanism that can adjust the distance between the second sides of the mounting base 531 and the first plate 532. For example, the first adjustment unit 534 may include a first threaded hole and a first screw. The first threaded hole may be located near the second side of the mounting base 531 or the second side of the first plate 532. The first screw may match the first threaded hole and penetrate the first plate 532. In operation, a distance between the second side of the mounting base 531 and the second side of the first plate 532 may be adjusted via rotating the first screw. In some embodiments, an entity may be regarded as being located near a certain side of a component (e.g., the mounting base 531, the first plate 532, the second plate 533) if, for example, a distance of the entity to the certain side is shorter than a threshold distance (e.g., a fixed threshold distance, a distance of the component to the opposite side of the certain side, etc.).

Figure 12:
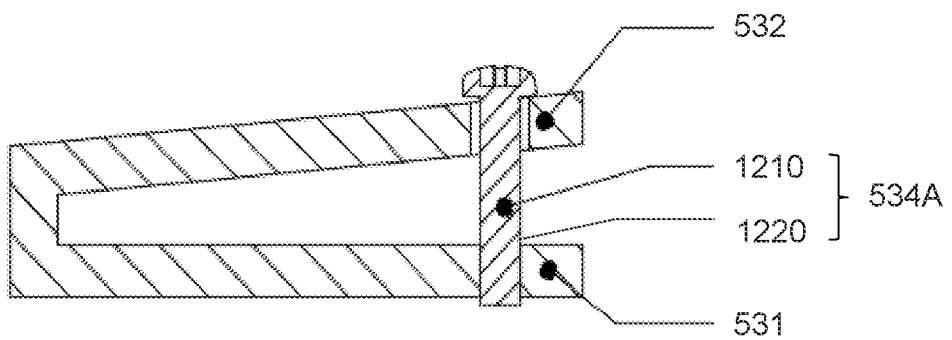
FIG. 12 illustrates an exemplary first adjustment unit according to some embodiments of the present disclosure.

For illustration purposes, FIG. 12 illustrates an exemplary first adjustment unit 534A according to some embodiments of the present disclosure. As shown in FIG. 12, the first adjustment unit 534A may include a threaded hole 1220 near the second side of the mounting base 531 and a screw 1210 matching the threaded hole 1220. One end of the screw 1210 may penetrate a through hole of the first plate 532 and form a screw head. The screw head may abut the upper surface of the first plate 532. In operation, a distance between the second side of the mounting base 531 and the second side of the first plate 532 may be adjusted via rotating the screw 1210. For example, when the screw 1210 is rotated in a certain direction (e.g., clockwise), the screw head of the screw 1210 and the first plate 532 may move away from the mounting base 531, such that the distance between the second side of the mounting base 531 and the second side of the first plate 532 may increase. In the meantime, the angle between the mounting base 531 and the first plate 532 may increase. The second plate 533 may move with the first plate 532 and the angle between the second plate 533 and the mounting base 531 may increase accordingly. The photosensitive chip 540 detachably mounted on the second plate 533 may rotate around the first rotation axis with the movement of the second plate 533, and the angle between the photosensitive chip 540 and the mounting base 531 may increase. As another example, when the screw 1210 is rotated in a reverse direction of the certain direction, the screw head of the screw 1210 and the first plate 532 may move toward the mounting base 531, such that the distance between the second side of the mounting base 531 and the second side of the first plate 532 may be reduced.

Figure 13:
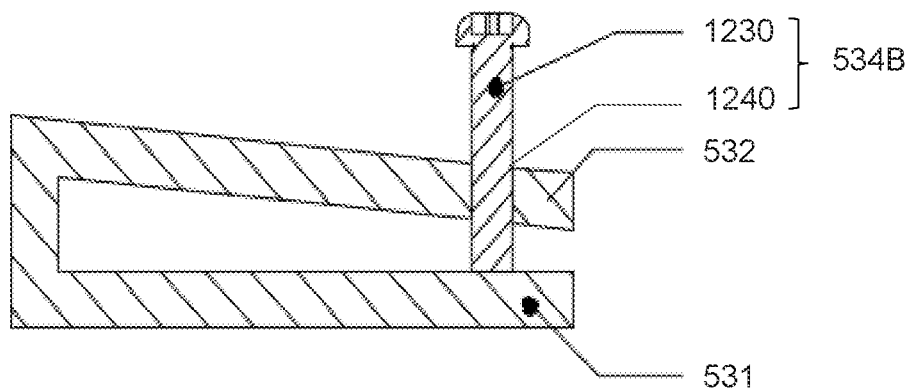
FIG. 13 illustrates another exemplary first adjustment unit according to some embodiments of the present disclosure.

As another example, FIG. 13 illustrates an exemplary first adjustment unit 534B according to some embodiments of the present disclosure. The first adjustment unit 534B may be similar to the first adjustment unit 534A as described in connection with FIG. 12, except for certain components or features. As shown in FIG. 13, the first adjustment unit 534B may include a threaded hole 1240 near the second side of the first plate 532 and a screw 1230 matching the threaded hole 1240. One end of the screw 1230 may penetrate a through hole of the first plate 532 and form a screw head. Another end of the screw 1230 may abut the upper surface of the mounting base 531. In operation, a distance between the second side of the mounting base 531 and the second side of the first plate 532 may be adjusted via rotating the screw 1230. For example, when the screw 1230 is rotated in a certain direction (e.g., counterclockwise), the first plate 532 may move relative to the screw 1230 and move away from the mounting base 531, such that the distance between the second side of the mounting base 531 and the second side of the first plate 532 may increase. As another example, when the screw 1230 is rotated in a reverse direction of the certain direction, the first plate 532 may move toward the mounting base 531, such that the distance between the second side of the mounting base 531 and the second side of the first plate 532 may be reduced.

Figure 11:
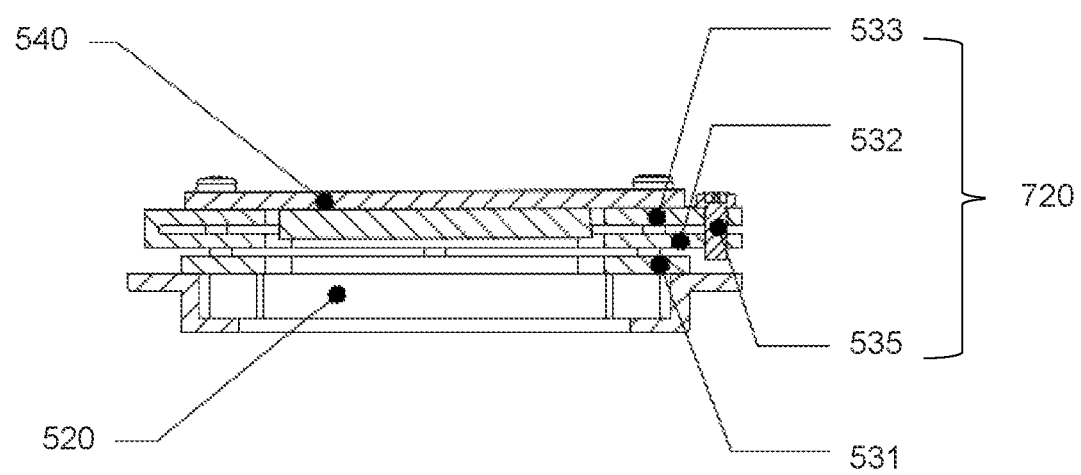
FIG. 11 illustrates a side view of an exemplary second adjustment mechanism according to some embodiments of the present disclosure.

FIG. 11 illustrates a side view of an exemplary second adjustment mechanism 720 according to some embodiments of the present disclosure.

As shown in FIG. 11, the second adjustment mechanism 720 may include the first plate 532, the second plate 533, and the second adjustment unit 535. The side view of the second adjustment mechanism 720 illustrated in FIG. 11 may be seen from the direction facing the first sides of the first plate 532 and the second plate 533. The first plate 532 may be placed between the mounting base 531 and the second plate 533. The mounting base 531 may be detachably connected to the camera housing 520. The photosensitive chip 540 may be detachably mounted on the second plate 533. In some embodiments, the second adjustment unit 535 may be mechanically connected to a fourth side (e.g., the fourth side 532d as described in connection with FIGS. 7-9C) of the first plate 532 and a fourth side (e.g., the fourth side 533d as described in connection with FIGS. 7-9C) of the second plate 533. For example, the first plate 532 may include a third convex part at its fourth side, and the second plate 533 may include a fourth convex part at its fourth side. The second adjustment unit 535 may be mechanically connected to the third convex part and the fourth convex part.

In some embodiments, the second adjustment unit 535 may include any mechanism that can adjust the distance between the fourth sides of the first plate 532 and the second plate 533. For example, the second adjustment unit 535 may include a second threaded hole and a second screw. The second threaded hole may be located near the fourth side of the first plate 532 or the fourth side of the second plate 533. The second screw may match the second threaded hole and penetrate the second plate 533. In operation, a distance between the fourth side of the first plate 532 and the fourth side of the second plate 533 may be adjusted via rotating the second screw.

In some embodiments, the second adjustment unit 535 may have a same structure as or a similar structure to the first adjustment unit 534A as described in connection with FIG. 12. Alternatively, the second adjustment unit 535 may have a same structure as or a similar structure to the first adjustment unit 534B as described in connection with FIG. 13.

It should be noted that the example illustrated in FIGS. 10-13 and the above descriptions thereof are merely provided for the purposes of illustration, and not intended to limit the scope of the present disclosure. For persons having ordinary skills in the art, multiple variations and modifications may be made under the teachings of the present disclosure. In some embodiments, the adjustment mechanisms may include one or more additional components and/or one or more components of the adjustment mechanisms described above may be omitted. Moreover, the position, the shape, and/or the size of a component as shown in FIGS. 10 and 13 are illustrative, and the component may be mounted at any position and have any size and/or shape. However, those variations and modifications do not depart from the scope of the present disclosure.

Figure 14:
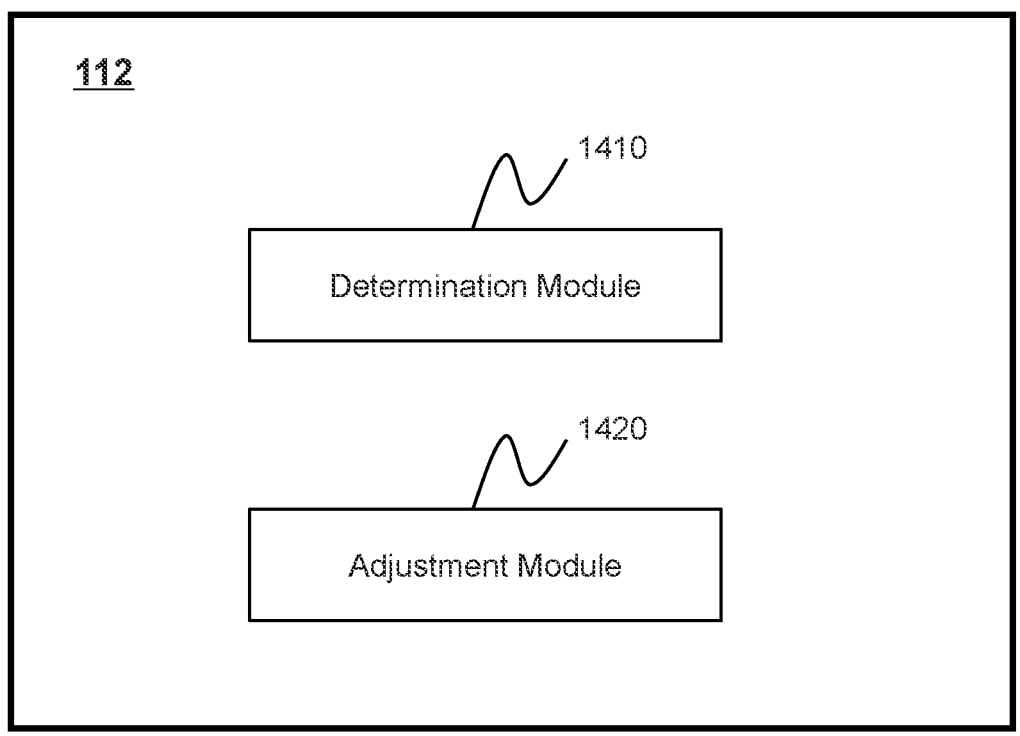
FIG. 14 is a block diagram illustrating an exemplary processing device according to some embodiments of the present disclosure.

FIG. 14 is a block diagram illustrating an exemplary processing device 112 according to some embodiments of the present disclosure. The processing device 112 may include a determination module 1410 and an adjustment module 1420. The processing device 112 may be implemented on various components (e.g., the computing device 200 as illustrated in FIG. 2, the mobile device 300 as illustrated in FIG. 3).

The determination module 1410 may be configured to determine one or more symmetrical axes of a photosensitive chip. For example, the determination module 1410 may determine a first symmetrical axis and a second symmetrical axis of the photosensitive chip. The first symmetrical axis and the second symmetrical axis may be any symmetrical axis of the photosensitive chip. In some embodiments, the first symmetrical axis may pass through a central point of the photosensitive chip and be parallel with an intersection line between the photosensitive chip and a mounting base of the photosensitive chip. The first symmetrical axis may divide the photosensitive chip into a first portion and a second portion which are symmetrical with each other with respect to the first symmetrical axis. The second symmetrical axis may be perpendicular to the first symmetrical axis at the central point of the photosensitive chip. The second symmetrical axis may divide the photosensitive chip into a third portion and a fourth portion which are symmetrical with each other with respect to the second symmetrical axis. More descriptions regarding the determination of the first and second symmetrical axes may be found elsewhere in the present disclosure. See, e.g., operation 1510 and relevant descriptions thereof.

The adjustment module 1420 may be configured to adjust the position of the photosensitive chip from an initial position to an adjusted position. The initial position may refer to a position of the photosensitive chip before adjustment. In some embodiments, the initial position may be the position of the photosensitive chip at the present moment. The adjusted position of the photosensitive chip may refer to a position at which the photosensitive chip is in a balanced status. For example, when the photosensitive chip is at the adjusted position, a first image resolution corresponding to the first portion of the photosensitive chip may be substantially equal to a second image resolution corresponding to the second portion of the photosensitive chip, and/or a third image resolution corresponding to the third portion may be substantially equal to a fourth image resolution corresponding to the fourth portion. In some embodiments, the adjustment module 1420 may adjust the position of the photosensitive chip from the initial position to the adjusted position by adjusting an angle between the photosensitive chip and the mounting base and/or adjusting an angle between the photosensitive chip and a reference plane of the photosensitive chip. More descriptions regarding the position adjustment of the photosensitive chip may be found elsewhere in the present disclosure. See, e.g., operation 1520 and relevant descriptions thereof.

It should be noted that the above descriptions of the processing device 112 are provided for the purposes of illustration, and not intended to limit the scope of the present disclosure. For persons having ordinary skills in the art, various modifications and changes in the forms and details of the application of the above method and system may occur without departing from the principles of the present disclosure. Merely by way of example, the processing device 112 may include one or more other modules. Additionally or alternatively, a module of the processing device 112 may be divided into a plurality of units, and/or the modules of the 112 described above may be integrated into a single module. However, those variations and modifications also fall within the scope of the present disclosure.

Figure 15:
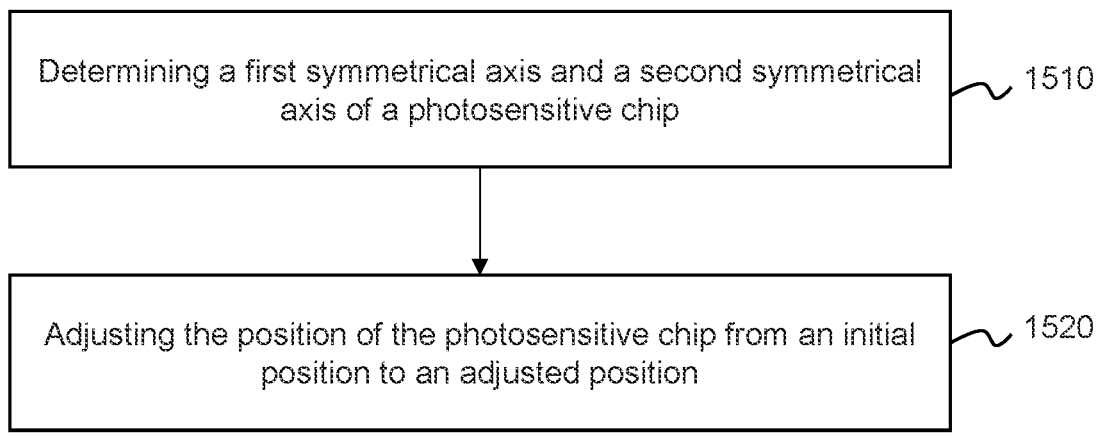
FIG. 15 is a flowchart illustrating an exemplary process for adjusting a position of a photosensitive chip of an image acquisition device according to some embodiments of the present disclosure.

FIG. 15 is a flowchart illustrating an exemplary process for adjusting a position of a photosensitive chip of an image acquisition device according to some embodiments of the present disclosure. In some embodiments, at least part of process 1500 may be performed by the image acquisition system 100. For example, the process 1500 may be stored in a storage device (e.g., the storage device 140, the storage 203, the storage 390) in the form of instructions (e.g., an application). The processing device 112 (e.g., the processor 201 illustrated in FIG. 2, the CPU 340 illustrated in FIG. 3, or one or more modules in the processing device 112 illustrated in FIG. 14) may invoke and/or execute the instructions and accordingly direct the image acquisition system 100 to perform the process 1500.

In 1510, the processing device 112 (e.g., the determination module 1410) may determine a first symmetrical axis and a second symmetrical axis of the photosensitive chip.

The first symmetrical axis and the second symmetrical axis may be any symmetrical axis of the photosensitive chip. In some embodiments, the first symmetrical axis may pass through a central point of the photosensitive chip and be parallel with an intersection line between the photosensitive chip and a mounting base of the photosensitive chip. The first symmetrical axis may divide the photosensitive chip into a first portion and a second portion which are symmetrical with each other with respect to the first symmetrical axis. The second symmetrical axis may be perpendicular to the first symmetrical axis at the central point of the photosensitive chip. The second symmetrical axis may divide the photosensitive chip into a third portion and a fourth portion which are symmetrical with each other with respect to the second symmetrical axis.

Figure 17:
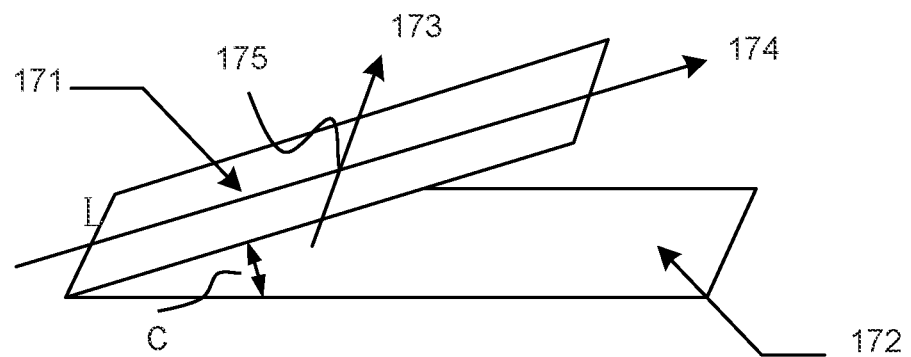
FIG. 17 is a schematic diagram illustrating an exemplary photosensitive chip and an exemplary mounting base according to some embodiments of the present disclosure.

Merely by way of example, FIG. 17 illustrates an exemplary photosensitive chip 171 at an initial position and an exemplary mounting base 172 according to some embodiments of the present disclosure. As shown in FIG. 17, the photosensitive chip 171 and the mounting base 172 may be quadrangles intersecting at an intersection line L. A first symmetrical axis 173 of the photosensitive chip 171 may pass through a central point 175 of the photosensitive chip 171 and be parallel with the intersection line L. The first symmetrical axis 173 may divide the photosensitive chip 171 into a first portion (i.e., a portion on the left of the first symmetrical axis 173 in FIG. 17) and a second portion (i.e., a portion on the right of the first symmetrical axis 173 in FIG. 17). A second symmetrical axis 174 of the photosensitive chip may be perpendicular to the first symmetrical axis 173 at the central point 175. The second symmetrical axis 174 may divide the photosensitive chip 171 into a third portion (i.e., a portion above the second symmetrical axis 174 in FIG. 17) and a fourth portion (i.e., a portion below the second symmetrical axis 174 in FIG. 17).

In some embodiments, in order to determine the first and second symmetrical axes of the photosensitive chip 171, the processing device 112 may determine the central point 175 of the photosensitive chip 171 and the intersection line L between the photosensitive chip 171 and the mounting base 172. The processing device 112 may further designate a line that passes through the central point 175 and is parallel with the intersection line L as the first symmetrical axis 173. Then, the processing device 112 may determine a line that passes through the central point 175 and is perpendicular to the first symmetrical axis 173 as the second symmetrical axis 174.

In some embodiments, the photosensitive chip 171 and the mounting base 172 may be exemplary embodiments of the photosensitive chip 540 and the mounting base 531 as described in connection with FIGS. 6-13, respectively. The photosensitive chip 171 may be detachably mounted on a position adjustment device (e.g., the position adjustment device 530 as described in connection with FIGS. 5 to 13). The position adjustment device may include a first adjustment mechanism (e.g., first adjustment mechanism 710) configured to control the photosensitive chip to rotate around a first rotation axis. The intersection line L and the first symmetrical axis 173 may be both parallel with the first rotation axis.

It should be noted that the photosensitive chip 171 and the mounting base 172 illustrated in FIG. 17 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the photosensitive chip 171 and the mounting base 172 may have any shape and/or size. For example, the photosensitive chip 171 may a symmetrical structure other than a quadrangle. In some alternative embodiments, the photosensitive chip 171 and the mounting base 172 may not actually contact with each other, and the planes where they are located may intersect with each other at the intersection line L.

In 1520, the processing device 112 (e.g., the adjustment module 1420) may adjust the position of the photosensitive chip from an initial position to an adjusted position.

The initial position may refer to a position of the photosensitive chip before adjustment (e.g., right before operation 1510). In some embodiments, the initial position may be the position of the photosensitive chip at the present moment. The adjusted position of the photosensitive chip may refer to a position at which the photosensitive chip is in a balanced status. In some embodiments, a position parameter of the photosensitive chip may satisfy a certain condition when the photosensitive chip is at the adjusted position (i.e., in a balanced status). For example, an angle between the photosensitive chip at the adjusted position and a certain plane (e.g., the mounting base or a front plane of the lens 510 as described in connection with FIG. 5) is smaller than a threshold angle.

In some embodiments, when the photosensitive chip is at the adjusted position, a first image resolution corresponding to the first portion of the photosensitive chip may be substantially equal to a second image resolution corresponding to the second portion of the photosensitive chip. Additionally or alternatively, when the photosensitive chip is at the adjusted position, a third image resolution corresponding to the third portion may be substantially equal to a fourth image resolution corresponding to the fourth portion. In such cases, the photosensitive chip may be in a balanced status, and an image captured using the photosensitive chip may have a uniform image resolution in different portions of the image, thereby improving the imaging quality of the image acquisition device.

Figure 20:
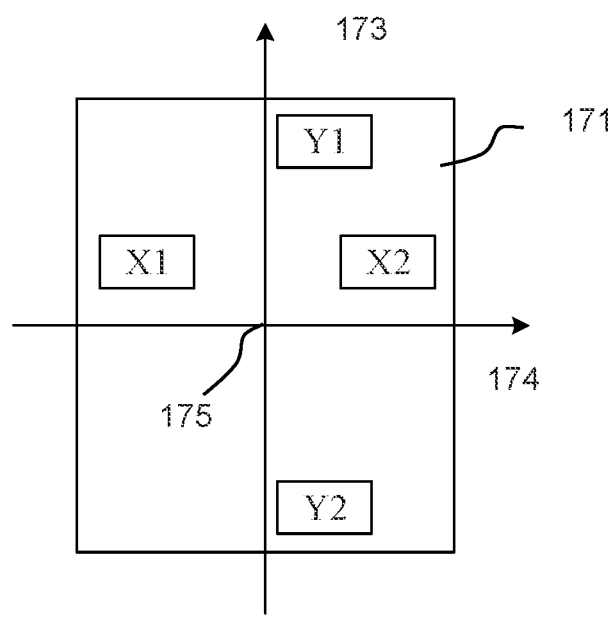
FIG. 20 is a schematic diagram illustrating exemplary symmetrical axes of a photosensitive chip according to some embodiments of the present disclosure.

As used herein, two values may be regarded as being substantially equal to each other if a difference between the two values is smaller than a threshold difference. The photosensitive chip may be used to acquire an image (or image data), and an image resolution corresponding to a certain portion of the photosensitive chip may refer to an image resolution of a portion of the image captured by the certain portion of the photosensitive chip. Merely by way of example, the photosensitive chip 171 as illustrated in FIG. 20 may be used to capture an image. Taking the first portion of the photosensitive chip 171 as an instance, the processing device 112 may segment a sub-region X1 in the first portion near the left edge of the photosensitive chip 171, and determine an image resolution of a region corresponding to the sub-region X1 in the image captured by the photosensitive chip 171, wherein the determined image resolution may be designated as the first image resolution. Similarly, the image resolutions corresponding to the second, third, and fourth portions of the photosensitive chip 171 may be determined based on the image resolutions corresponding to a sub-region X2, a sub-region Y1, and a sub-region Y2 as shown in FIG. 20, respectively. As another example, the processing device 112 may determine a region in the image corresponding to the whole first portion, and determine an average image resolution (e.g., pixels per inch (PPI), pixels per meter (PPM)) of the region as the first image resolution.

In some embodiments, the processing device 112 may adjust the position of the photosensitive chip by adjusting an angle between the photosensitive chip and the mounting base (e.g., an angle C between the photosensitive chip 171 and the mounting base 172 as shown in FIG. 17). Optionally, the processing device 112 may actuate a first adjustment mechanism (e.g., the first adjustment mechanism 710) as described elsewhere in this disclosure to adjust the angle between the photosensitive chip and the mounting base.

Figure 18:
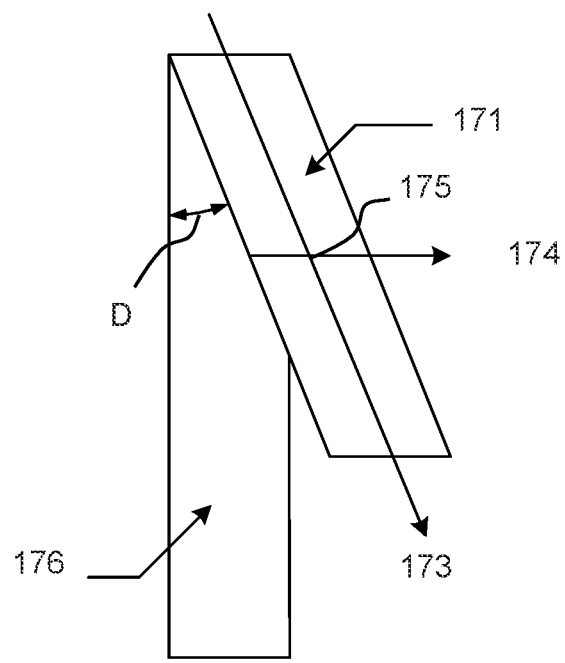
FIG. 18 is a schematic diagram illustrating an exemplary a photosensitive chip and an exemplary first reference plane according to some embodiments of the present disclosure.

Additionally or alternatively, the processing device 112 may adjust the position of the photosensitive chip by adjusting an angle between the photosensitive chip and a reference plane of the photosensitive chip. A reference plane may be parallel with the photosensitive chip when the photosensitive chip is located at a certain position (e.g., the initial position, an intermediate position between the initial position and the adjusted position). For example, FIG. 18 illustrates an exemplary reference plane 176 of the photosensitive chip 171 according to some embodiments of the present disclosure. The position of the photosensitive chip 171 may be adjusted by adjusting an angle D between the photosensitive chip 171 and the reference plane 176. Optionally, the processing device 112 may actuate a second adjustment mechanism (e.g., the second adjustment mechanism 720) as described elsewhere in this disclosure to adjust the angle between the photosensitive chip and the reference plane of the photosensitive chip. More descriptions regarding the position adjustment of the photosensitive chip may be found elsewhere in the present disclosure. See, e.g., FIG. 16 and relevant descriptions thereof.

In some embodiments, before adjusting the position of the photosensitive chip, the processing device 112 may determine whether the photosensitive chip is in an imbalanced status (or a balanced status). For example, before adjusting the position of the photosensitive chip, the processing device 112 may determine whether the first image resolution is substantially equal to the second image resolution and/or the third image resolution is substantially equal to the fourth image resolution when the photosensitive chip is at the initial position. If the first image resolution is substantially equal to the second image resolution and the third image resolution is substantially equal to the fourth image resolution when the photosensitive chip is at the initial position, the processing device 112 may determine that the photosensitive chip is in a balanced status. In such cases, it is unnecessary to adjust the position of the photosensitive chip and the initial position may be designated as the adjusted position. If the first image resolution is not substantially equal to the second image resolution or the third image resolution is not substantially equal to the fourth image resolution when the photosensitive chip is at the initial position, the processing device 112 may perform the operation 1520 to adjust the position of the photosensitive chip from the initial position to the adjusted position.

It should be noted that the above descriptions of the process 1500 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, the process 1500 may include one or more other operations. However, those variations and modifications also fall within the scope of the present disclosure. The operations of the illustrated process presented above are intended to be illustrative. In some embodiments, the process 1500 may be accomplished with one or more additional operations not described, and/or without one or more of the operations discussed. Additionally, the order of the operations of the process 1500 as illustrated in FIG. 15 and described above is not intended to be limiting.

In some embodiments, the process 1500 may be performed intermittently (e.g., periodically or irregularly) or continuously. For example, the process 1500 may be performed at a preset time interval to periodically adjust the position of the photosensitive chip. As another example, the process 1500 may be performed in response to an instruction to adjust the position of the photosensitive chip inputted by a user. In some embodiments, in 1510, the number (or count) of the determined symmetrical axes may be variable. For example, the processing device 112 may determine only one symmetrical axis (e.g., the first symmetrical axis or the second symmetrical axis) that divides the photosensitive chip into two portions symmetrical to each other with respect to the symmetrical axis. The position of the photosensitive chip may be adjusted based on image resolutions corresponding to the two portions, e.g., to a position where the two portions have a substantially same image resolution.

In some embodiments, after the photosensitive chip is adjusted to the adjusted position, the photosensitive chip may be fixed (or locked) at the adjusted position to prevent a movement of the photosensitive chip. In some embodiments, the position adjustment of the photosensitive chip may be controlled remotely by a user via, for example, a user terminal. Merely by way of example, the user may set the adjusted position of the photosensitive chip (e.g., by setting an angle between the photosensitive chip and the mounting base).

Figure 16:
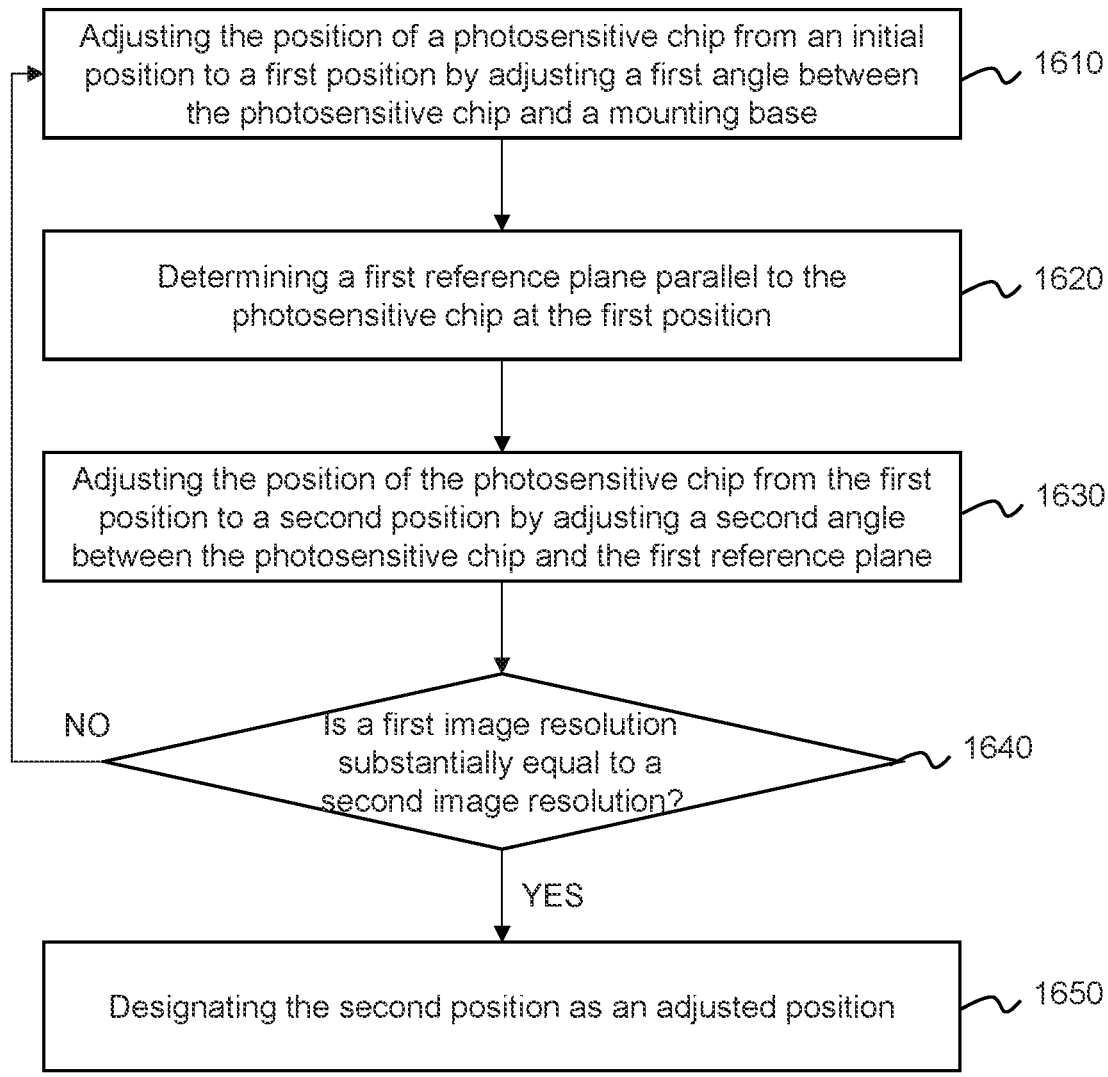
FIG. 16 is a flowchart illustrating an exemplary process for adjusting a position of a photosensitive chip from an initial position to an adjusted position according to some embodiments of the present disclosure.

FIG. 16 is a flowchart illustrating an exemplary process for adjusting a position of a photosensitive chip from an initial position to an adjusted position according to some embodiments of the present disclosure. In some embodiments, at least part of process 1600 may be performed by the image acquisition system 100. For example, the process 1600 may be stored in a storage device (e.g., the storage device 140, the storage 203, the storage 390) in the form of instructions (e.g., an application). The processing device 112 (e.g., the processor 201 illustrated in FIG. 2, the CPU 340 illustrated in FIG. 3, or one or more modules in the processing device 112 illustrated in FIG. 14) may invoke and/or execute the instructions and accordingly direct the image acquisition system 100 to perform the process 1600. In some embodiments, the operation 1520 may be achieved by performing one or more operations of the process 1600.

In 1610, the processing device 112 (e.g., the adjustment module 1420) may adjust the position of the photosensitive chip from the initial position to a first position by adjusting a first angle between the photosensitive chip and the mounting base.

Figure 19:
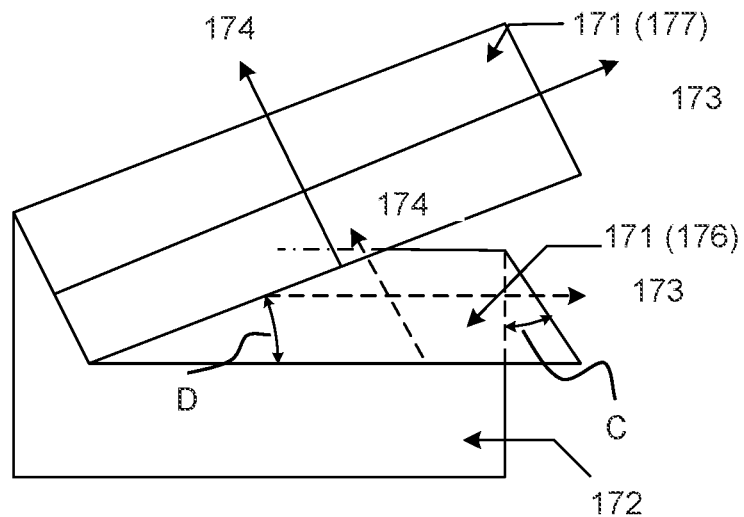
FIG. 19 is a schematic diagram illustrating an exemplary process of adjusting the position of a photosensitive chip according to some embodiments of the present disclosure.

The first position of the photosensitive chip may refer to a position at which the first image resolution corresponding to the first portion of the photosensitive chip may be substantially equal to the second image resolution corresponding to the second portion of the photosensitive chip. Merely by way of example, as shown in FIG. 19, the photosensitive chip 171 may be controlled to rotate around a rotation axis parallel with an intersection line between the photosensitive chip 171 and the mounting base 172. The first angle C between the photosensitive chip 171 and the mounting base 172 may be adjusted with the rotation of the photosensitive chip 171, such that the photosensitive chip 171 may be adjusted from its initial position to a first position (e.g., a position at which a plane 176 is located). At the first position, the image resolution corresponding to the first portion of the photosensitive chip 171 (i.e., a portion above of the first symmetrical axis 173 as shown in FIG. 19) may be substantially equal to that corresponding to the second portion of the photosensitive chip 171 (i.e., a portion below the first symmetrical axis 173 as shown in FIG. 19).

In some embodiments, the processing device 112 may determine a predicted value of the first angle when the photosensitive chip is at the first position. For example, the processing device 112 may determine the predicted value of the first angle based on one or more parameters relating to, for example, the imaging condition (e.g., a focal length, a pixel size) and/or the system geometry of the image acquisition device. Further, the processing device 112 may adjust the position of the photosensitive chip such that the first angle reaches or substantially reaches the predicted value of the first angle. In this way, the position of the photosensitive chip may be adjusted to the first position.

In some alternative embodiments, the processing device 112 may adjust the first angle for a certain number of times until the position of the photosensitive chip is adjusted from the initial position to the first position. Merely by way of example, the processing device 112 may adjust the first angle in steps (e.g., with a fixed or unfixed change in the first angle). For example, in a certain step, the first angle may be adjusted for a certain angle (e.g., 0.5°, 1°, 2°, etc.) to reach an updated value. The processing device 112 may determine whether the first image resolution is substantially equal to the second image resolution when the first angle reaches the updated value. If the first image resolution is substantially equal to the second image resolution when the first angle reaches the updated value, the processing device 112 may designate the position of the photosensitive chip corresponding to the updated value of the first angle as the first position. If the first image resolution is not substantially equal to the second image resolution when the first angle reaches the updated value, the processing device 112 may further to adjust the first angle until the first image resolution is substantially equal to the second image resolution.

In some embodiments, before adjusting the position of the photosensitive chip from the initial position to the first position, the processing device 112 may determine whether the first image resolution is substantially equal to the second image resolution when the photosensitive chip is at the initial position. If the first image resolution is substantially equal to the second image resolution when the photosensitive chip is at the initial position, it may be unnecessary to adjust the position of the photosensitive chip and the initial position may be designated as the first position.

In some embodiments, the processing device 112 may adjust the first angle using a first adjustment mechanism of a position adjustment device (e.g., the first adjustment mechanism 710 of the position adjustment device 530 as described elsewhere in this disclosure). For example, the processing device 112 may actuate the first adjustment mechanism to control the photosensitive chip to rotate around a first rotation axis, which may be parallel with the intersection line between the photosensitive chip and the mounting base. The value of the first angle between the photosensitive chip and the mounting base may change with the rotation of the photosensitive chip.

In 1620, the processing device 112 (e.g., the adjustment module 1420) may determine a first reference plane parallel with the photosensitive chip at the first position. The first reference plane may coincide with a surface of the photosensitive chip at the first position. Alternatively, the first reference plane may be any plane that is not coincident with the surface of the photosensitive chip but parallel with the photosensitive chip at the first position. Merely byway of example, as shown in FIG. 19, the photosensitive chip 171 may be adjusted to a first position indicated by the plane 176. The first reference plane of the photosensitive chip 171 may be the plane 176 itself or another plane parallel with the plane 176.

In 1630, the processing device 112 (e.g., the adjustment module 1420) may adjust the position of the photosensitive chip from the first position to a second position by adjusting a second angle between the photosensitive chip and the first reference plane.

The second position of the photosensitive chip may refer to a position at which the third image resolution corresponding to the third portion of the photosensitive chip may be substantially equal to the fourth image resolution corresponding to the fourth portion of the photosensitive chip. Merely by way of example, as shown in FIG. 19, the photosensitive chip 171 may be controlled to rotate around a rotation axis parallel with an intersection line between the photosensitive chip 171 and the plane 176 (i.e., the first reference plane). A second angle D between the photosensitive chip 171 and the plane 176 may be adjusted with the rotation of the photosensitive chip 171, such that the photosensitive chip 171 may be adjusted from the first position to a second position (e.g., a position at which a plane 177 is located). At the second position, the image resolution corresponding to the third portion of the photosensitive chip 171 (i.e., a portion to the left of the second symmetrical axis 174 as shown in FIG. 19) may be substantially equal to that corresponding to the fourth portion of the photosensitive chip 171 (i.e., a portion right to the second symmetrical axis 174 as shown in FIG. 19).

In some embodiments, the position adjustment of the photosensitive chip from the first position to the second position may be performed in a similar manner with the position adjustment of the photosensitive chip from the initial position to the first position as described in connection with 1610. For example, the processing device 112 may determine a predicted value of the second angle when the photosensitive chip is at the second position. Further, the processing device 112 may adjust the position of the photosensitive chip such that the value of the second angle reaches or substantially reaches the predicted value of the second angle and the position of the photosensitive chip is adjusted to the second position. As another example, the processing device 112 may adjust the second angle for a certain number of times until the position of the photosensitive chip is adjusted from the first position to the second position.

In some embodiments, before adjusting the position of the photosensitive chip from the first position to the second position, the processing device 112 may determine whether the third image resolution is substantially equal to the fourth image resolution when the photosensitive chip is at the first position. If the third image resolution is substantially equal to the fourth image resolution when the photosensitive chip is at the first position, it may be unnecessary to adjust the position of the photosensitive chip and the first position may be designated as the second position.

In some embodiments, the processing device 112 may adjust the second angle using a second adjustment mechanism of a position adjustment device (e.g., the second adjustment mechanism 720 of the position adjustment device 530 as described elsewhere in this disclosure). For example, the processing device 112 may actuate the second adjustment mechanism to control the photosensitive chip to rotate around a second rotation axis, which may be parallel with an intersection line between the photosensitive chip and the first reference plane. The value of the second angle between the photosensitive chip and the first reference plane may change with the rotation of the photosensitive chip.

In 1640, the processing device 112 (e.g., the adjustment module 1420) may determine whether the first image resolution is substantially equal to the second image resolution when the photosensitive chip is at the second position.

In response to a determination that the first image resolution is substantially equal to the second image resolution when the photosensitive chip is at the second position, the process 1600 may proceed to 1650, in which the processing device 112 may designate the second position as the adjusted position. The validation of the first image resolution and the second image resolution of the photosensitive chip at the second position may ensure that the photosensitive chip is moved to a balanced status and improve the accuracy of position adjustment.

In response to a determination that the first image resolution is not substantially equal to the second image resolution when the photosensitive chip is at the second position, the processing device 112 may further adjust the first angle between the photosensitive chip and the mounting base so as to adjust the position of the photosensitive chip to the adjusted position. For example, the processing device 112 may proceed to 1610 again. The second position may be regarded as an initial position of the photosensitive chip and the processing device 112 may perform process 1600 again to adjust the position of the photosensitive chip.

It should be noted that the above descriptions of the process 1600 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, the process 1600 may include one or more other operations. However, those variations and modifications also fall within the scope of the present disclosure. The operations of the illustrated process presented above are intended to be illustrative. In some embodiments, the process 1600 may be accomplished with one or more additional operations not described, and/or without one or more of the operations discussed. Additionally, the order of the operations of the process 1600 as illustrated in FIG. 16 and described above is not intended to be limiting. For example, the operation 1640 and operation 1650 presented above may be omitted. The processing device 112 may designate the second position as the adjusted position directly after the position of the photosensitive chip is adjusted from the first position to the second position.

In some embodiments, to adjust the photosensitive chip from the initial position to the adjusted position, the processing device 112 may first adjust a third angle between the photosensitive chip at the initial position and a second reference plane, and then adjust the first angle between the photosensitive chip and the mounting base. Merely by way of example, the processing device 112 may determine a second reference plane which is parallel with the photosensitive chip at the initial position. Further, the processing device 112 may adjust the position of the photosensitive chip from the initial position to a third position by adjusting the third angle between the photosensitive chip and the second reference plane. The third position of the photosensitive chip may refer to a position at which the third image resolution corresponding to the third portion of the photosensitive chip may be substantially equal to the fourth image resolution corresponding to the fourth portion of the photosensitive chip. The position adjustment of the photosensitive chip from the initial position to the third position may be performed in a similar manner with the position adjustment of the photosensitive chip from the first position to the second position as described in connection with 1630, and the descriptions thereof are not repeated here.

The processing device 112 may then adjust the position of the photosensitive chip from the third position to a fourth position by adjusting the first angle between the photosensitive chip and the mounting base. The fourth position of the photosensitive chip may refer to a position at which the first image resolution corresponding to the first portion of the photosensitive chip may be substantially equal to the second image resolution corresponding to the second portion of the photosensitive chip. The position adjustment of the photosensitive chip from the third position to the fourth position may be performed in a similar manner with the position adjustment of the photosensitive chip from the initial position to the first position as described in connection with 1610, and the descriptions thereof are not repeated here.

Optionally, the processing device 112 may further determine whether the third image resolution is substantially equal to the fourth image resolution when the photosensitive chip is at the fourth position. In response to a determination that the third image resolution is substantially equal to the fourth image resolution, the processing device 112 may designate the fourth position as the adjusted position. In response to a determination that the third image resolution is not substantially equal to the fourth image resolution, the processing device 112 may further adjust the third angle between the photosensitive chip and the second reference plane so as to adjust the position of the photosensitive chip to the adjusted position. Alternatively, a third reference plane that is parallel with the photosensitive chip at the fourth position may be determined. The processing device 112 may further adjust an angle between the photosensitive chip and the third reference plane.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for adjusting a position of a photosensitive chip of an image acquisition device, comprising:
    at least one storage device storing a set of instructions; and
    at least one processor configured to communicate with the at least one storage device, wherein when executing the set of instructions, the at least one processor is configured to direct the system to perform operations including:
        determining a first symmetrical axis and a second symmetrical axis of the photosensitive chip, the photosensitive chip and a mounting base of the photosensitive chip intersecting at a first intersection line, the first symmetrical axis being parallel with the first intersection line, the first symmetrical axis dividing the photosensitive chip into a first portion and a second portion, and the second symmetrical axis being perpendicular to the first symmetrical axis at a central point of the photosensitive chip and dividing the photosensitive chip into a third portion and a fourth portion; and
        adjusting the position of the photosensitive chip from an initial position to an adjusted position by a rotation of the photosensitive chip around the first intersection line or a second intersection line between the photosensitive chip and a reference plane, wherein
        the reference plane is parallel with the photosensitive chip when the photosensitive chip is located at the initial position or a position between the initial position and the adjusted position,
        when the photosensitive chip is at the adjusted position, a first image resolution corresponding to the first portion is substantially equal to a second image resolution corresponding to the second portion, and a third image resolution corresponding to the third portion is substantially equal to a fourth image resolution corresponding to the fourth portion.

2. The system of claim 1, wherein to adjust the position of the photosensitive chip from an initial position to an adjusted position, the at least one processor is configured to direct the system to perform operations including:
    adjusting the position of the photosensitive chip from the initial position to a first position by the rotation of the photosensitive chip around the first intersection line to adjust a first angle between the photosensitive chip and the mounting base, wherein when the photosensitive chip is at the first position, the first image resolution is substantially equal to the second image resolution;
    determining the reference plane parallel with the photosensitive chip at the first position; and adjusting the position of the photosensitive chip from the first position to a second position by the rotation of the photosensitive chip around the second intersection line to adjust a second angle between the photosensitive chip and the reference plane, wherein when the photosensitive chip is at the second position, the third image resolution is substantially equal to the fourth image resolution.

3. The system of claim 2, wherein the at least one processor is further configured to direct the system to perform operations including:
   determining whether the first image resolution is substantially equal to the second image resolution when the photosensitive chip is at the second position; and
   in response to a determination that the first image resolution is substantially equal to the second image resolution when the photosensitive chip is at the second position, designating the second position as the adjusted position, or
   in response to a determination that the first image resolution is not substantially equal to the second image resolution when the photosensitive chip is at the second position, adjusting the position of the photosensitive chip to the adjusted position by further adjusting the first angle between the photosensitive chip and the mounting base.

4. The system of claim 1, wherein to adjust the position of the photosensitive chip from an initial position to an adjusted position, the at least one processor is further configured to direct the system to perform operations including:
   determining the reference plane parallel with the photosensitive chip at the initial position;
   adjusting the position of the photosensitive chip from the initial position to a third position by the rotation of the photosensitive chip around the second intersection line to adjust a third angle between the photosensitive chip and the reference plane, wherein when the photosensitive chip is at the third position, the third image resolution is substantially equal to the fourth image resolution; and
   adjusting the position of the photosensitive chip from the third position to a fourth position by the rotation of the photosensitive chip around the first intersection line to adjust a first angle between the photosensitive chip and the mounting base, wherein when the photosensitive chip is at the fourth position, the first image resolution is substantially equal to the second image resolution.

5. The system of claim 4, wherein the at least one processor is further configured to direct the system to perform operations including:
   determining whether the third image resolution is substantially equal to the fourth image resolution when the photosensitive chip is at the fourth position; and
   in response to a determination that the third image resolution is substantially equal to the fourth image resolution when the photosensitive chip is at the fourth position, designating the fourth position as the adjusted position, or
   in response to a determination that the third image resolution is not substantially equal to the fourth image resolution when the photosensitive chip is at the fourth position, adjusting the position of the photosensitive chip to the adjusted position by further adjusting the third angle between the photosensitive chip and the reference plane.

6. The system of claim 1, wherein the position of the photosensitive chip is adjusted via a position adjustment device of the photosensitive chip, the position adjustment device comprising:
   a first adjustment mechanism configured to control the photosensitive chip to rotate around a first rotation axis; and
   a second adjustment mechanism mechanically connected to the first adjustment mechanism and configured to control the photosensitive chip to rotate around a second rotation axis, wherein:
   the photosensitive chip is detachably mounted on the second adjustment mechanism, and
   the first rotation axis forms an angle with the second rotation axis.

7. A position adjustment device for adjusting a position of a photosensitive chip of an image acquisition device, comprising:
   a first adjustment mechanism configured to control the photosensitive chip to rotate around a first rotation axis; and
   a second adjustment mechanism mechanically connected to the first adjustment mechanism and configured to control the photosensitive chip to rotate around a second rotation axis, wherein:
   the first adjustment mechanism includes a first plate and a mounting base, and a distance between the first plate and the mounting base is adjusted so that the photosensitive chip rotates around the first rotation axis,
   the second adjustment mechanism includes the first plate and a second plate, the first plate is placed between the mounting base and the second plate, and a distance between the first plate and the second plate is adjusted so that the photosensitive chip rotates around the second rotation axis,
   the photosensitive chip is detachably mounted on the second adjustment mechanism, and
   the first rotation axis forms an angle with the second rotation axis.

8. The position adjustment device of claim 7, wherein the first adjustment mechanism comprises:
   the mounting base having a first side parallel with the first rotation axis and a second side opposite to the first side of the mounting base;
   the first plate having a first side parallel with the first rotation axis and a second side opposite to the first side of the first plate, the first side of the first plate being mechanically connected to the first side of the mounting base; and
   the first adjustment unit mechanically connected to the second side of the mounting base and the second side of the first plate, the first adjustment unit being configured to adjust a distance between the second side of the mounting base and the second side of the first plate such that the photosensitive chip rotates around the first rotation axis.

9. The position adjustment device of claim 8, wherein the first adjustment mechanism further comprises:
   a first connector configured to establish a mechanical connection between the first side of the first plate and the first side of the mounting base.

10. The position adjustment device of claim 9, wherein the first plate, the mounting base, and the first connector form an integral part.

11. The position adjustment device of claim 8, the first adjustment unit including:

a first threaded hole located near the second side of the mounting base or the second side of the first plate; and a first screw matching the first threaded hole and penetrating the first plate, wherein the distance between the second side of the mounting base and the second side of the first plate is adjusted via rotating the first screw.

12. The position adjustment device of claim 8, wherein the mounting base includes a first convex part at its second side, the first plate includes a second convex part at its second side, and the first adjustment unit is mechanically connected to the first convex part and the second convex part.

13. The position adjustment device of claim 8, wherein the first plate further has a third side parallel with the second rotation axis and a fourth side opposite to the third side of the first plate, the second adjustment mechanism comprises:

the second plate having a third side parallel with the second rotation axis and a fourth side opposite to the third side of the second plate;

the third side of the first plate being mechanically connected to the third side of the second plate; and the second adjustment unit mechanically connected to the fourth side of the first plate and the second side of the second plate, the second adjustment unit being configured to adjust a distance between the fourth side of the first plate and the fourth side of the second plate such that the photosensitive chip rotates around the second rotation axis.

14. The position adjustment device of claim 13, wherein the second adjustment mechanism further comprises:

a second connector configured to establish a mechanical connection between the third side of the first plate and the first side of the second plate.

15. The position adjustment device of claim 14, wherein the first plate, the second plate, and the second connector form an integral part.

16. The position adjustment device of claim 13, the second adjustment unit including:

a second threaded hole located near the fourth side of the first plate or the fourth side of the second plate; and a second screw matching the second threaded hole and penetrating the second plate, wherein the distance between the fourth side of the first plate and the second side of the second plate is adjusted via rotating the second screw.

17. The position adjustment device of claim 13, wherein the first plate includes a third convex part at its fourth side, the second plate includes a fourth convex part at its fourth side, and the second adjustment unit is mechanically connected to the third convex part and the fourth convex part.

18. The position adjustment device of claim 7, wherein to adjust the position of the photosensitive chip, a method implemented on a computing device having at least one processor and at least one storage device is performed, the method comprising:

determining a first symmetrical axis and a second symmetrical axis of the photosensitive chip, the first symmetrical axis being parallel with an intersection line between the photosensitive chip and the mounting base of the photosensitive chip, the first symmetrical axis dividing the photosensitive chip into a first portion and a second portion, and the second symmetrical axis being perpendicular to the first symmetrical axis at a central point of the photosensitive chip and dividing the photosensitive chip into a third portion and a fourth portion; and adjusting the position of the photosensitive chip from an initial position to an adjusted position using the position adjustment device, wherein when the photosensitive chip is at the adjusted position, a first image resolution corresponding to the first portion is substantially equal to a second image resolution corresponding to the second portion, and a third image resolution corresponding to the third portion is substantially equal to a fourth image resolution corresponding to the fourth portion.

19. The position adjustment device of claim 18, wherein the adjusting the position of the photosensitive chip from an initial position to an adjusted position comprises:

adjusting the position of the photosensitive chip from the initial position to a first position by adjusting a first angle between the photosensitive chip and the mounting base using the first adjustment mechanism, wherein when the photosensitive chip is at the first position, the first image resolution is substantially equal to the second image resolution; and determining a first reference plane parallel with the photosensitive chip at the first position; and adjusting the position of the photosensitive chip from the first position to a second position by adjusting a second angle between the photosensitive chip and the first reference plane using the second adjustment mechanism, wherein when the photosensitive chip is at the second position, the third image resolution is substantially equal to the fourth image resolution.

20. A method for adjusting a position of a photosensitive chip of an image acquisition device, implemented on a computing device including a processor and a storage device, comprising:

determining a first symmetrical axis and a second symmetrical axis of the photosensitive chip, the photosensitive chip and a mounting base of the photosensitive chip intersecting at a first intersection line, the first symmetrical axis being parallel with the first intersection line, the first symmetrical axis dividing the photosensitive chip into a first portion and a second portion, and the second symmetrical axis being perpendicular to the first symmetrical axis at a central point of the photosensitive chip and dividing the photosensitive chip into a third portion and a fourth portion; and adjusting the position of the photosensitive chip from an initial position to an adjusted position by a rotation of the photosensitive chip around the first intersection line or a second intersection line between the photosensitive chip and a reference plane, wherein the reference plane is parallel with the photosensitive chip when the photosensitive chip is located at the initial position or a position between the initial position and the adjusted position, when the photosensitive chip is at the adjusted position, a first image resolution corresponding to the first portion is substantially equal to a second image resolution corresponding to the second portion, and a third image resolution corresponding to the third portion is substantially equal to a fourth image resolution corresponding to the fourth portion.

\* \* \* \* \*